US012784479B2

(12) United States Patent
Cho et al.

(10) Patent No.: US 12,784,479 B2
(45) Date of Patent: Nov. 3, 2026

(54) METHOD AND DEVICE OF ANNOTATION OF DETECTED OBJECT

(71) Applicant: 42DOT INC., Seoul (KR)

(72) Inventors: Hoon Kyung Cho, Seoul (KR); Jung Pil Park, Goyang (KR); Myoung Hoon Cho, Seoul (KR)

(73) Assignee: 42DOT INC., Seoul (KR)

( * ) Notice: Subject to any disclaimer, the term of this patent is extended or adjusted under 35 U.S.C. 154(b) by 391 days.

(21) Appl. No.: 18/459,335

(22) Filed: Aug. 31, 2023

(65) Prior Publication Data

US 2024/0242521 A1 Jul. 18, 2024

(30) Foreign Application Priority Data

Sep. 2, 2022 (KR) ........................ 10-2022-0111491
Oct. 20, 2022 (KR) ........................ 10-2022-0135629
Nov. 30, 2022 (KR) ........................ 10-2022-0164963
Nov. 30, 2022 (KR) ........................ 10-2022-0164964

(51) Int. Cl.
*G06V 20/70* (2022.01)
*G06V 10/764* (2022.01)
*G06V 20/58* (2022.01)

(52) U.S. Cl.
CPC ............ *G06V 20/70* (2022.01); *G06V 10/764* (2022.01); *G06V 20/58* (2022.01); *G06V 2201/08* (2022.01)

(58) Field of Classification Search
CPC ...... G06V 20/70; G06V 20/58; G06V 10/764; G06V 2201/08
See application file for complete search history.

(56) References Cited

U.S. PATENT DOCUMENTS

2013/0321627 A1* 12/2013 Turn, Jr. ................ H04N 23/21 348/148
2019/0064841 A1* 2/2019 Tong .................... G05D 1/0253
2019/0294889 A1* 9/2019 Sriram ............... G06V 10/7625
2019/0362186 A1* 11/2019 Irshad .................. G06V 10/764
2020/0005485 A1 1/2020 Xu
2020/0082180 A1 3/2020 Wang
2021/0116914 A1* 4/2021 Ren ...................... B60W 40/114

FOREIGN PATENT DOCUMENTS

CN 111024040 A * 4/2020 ............... G06T 7/60
JP 2020-173799 A 10/2020
KR 10-2020-0133839 A 12/2020
KR 10-2021-0075225 A 6/2021
KR 10-2310595 B1 10/2021
(Continued)

OTHER PUBLICATIONS

3D Bounding Box Estimation Using Deep Learning and Geometry, Arsalan Mousavian et al. (Apr. 10, 2017).
(Continued)

*Primary Examiner* — Pinalben Patel
(74) *Attorney, Agent, or Firm* — Harvest IP Law, LLP

(57) ABSTRACT

Provided are a method and device for annotating a detected object. The method of annotating a detected object may include classifying a class of the object, generating a bounding box including a first quadrangle and a second quadrangle both sharing one side, for the object based on the class of the object, and generating an annotation on the object in units of the bounding box.

12 Claims, 51 Drawing Sheets

(56) References Cited

FOREIGN PATENT DOCUMENTS

| | | | | |
|---|---|---|---|---|
| KR | 10-2313944 | B1 | 10/2021 | |
| WO | WO-2018184963 | A2 * | 10/2018 | ............. G06V 20/64 |

OTHER PUBLICATIONS

A Traffic Surveillance System for Obtaining Comprehensive Information of the Passing Vehicles Based on Instance Segmentation, Bo Zhang and Jian Zhang, IEEE Transactions on Intelligent Transportation System, vol. 22, No. 11, Nov. 2021.

GS3D: An Efficient 3D Object Detection Framework for Autonomous Driving, Buyu Li et al. (Mar. 27, 2019).

Boxy Vehicle Detection in Large Images, Karsten Behrendt, Bosch Automated Driving, https://boxy-dataset.com/.

* cited by examiner (b)

METHOD AND DEVICE OF ANNOTATION OF DETECTED OBJECT

CROSS-REFERENCE TO RELATED APPLICATION

This application is based on and claims priority under 35 U.S.C. § 119 to Korean Patent Application No. 10-2022-0111491, filed on Sep. 2, 2022, No. 10-2022-0135629, filed on Oct. 20, 2022, No. 10-2022-0164963, filed on Nov. 30, 2022 and No. 10-2022-0164964, filed on Nov. 30, 2022, in the Korean Intellectual Property Office, the disclosure of which is incorporated by reference herein in its entirety.

BACKGROUND

1. Field

The present disclosure relates to a method and device for annotating a detected object.

2. Description of the Related Art

Artificial intelligence (AI) refers to a technology for artificially implementing human learning and reasoning abilities by using computer programs. In relation to AI, machine learning refers to learning using a model including a plurality of parameters, to optimize the parameters based on given data.

For AI training, it is necessary to design training data. Designing training data requires data processing, among such processes, annotation refers to generating a bounding box for an object included in image data and inputting necessary information.

SUMMARY

Provided are methods and devices for annotating a detected object. Technical objectives of the present disclosure are not limited to the foregoing, and other unmentioned objects or advantages of the present disclosure would be understood from the following description and be more clearly understood from the embodiments of the present disclosure. In addition, it would be appreciated that the objectives and advantages of the present disclosure can be implemented by means provided in the claims and a combination thereof.

Additional aspects will be set forth in part in the description which follows and, in part, will be apparent from the description, or may be learned by practice of the presented embodiments of the disclosure.

According to an aspect of an embodiment, a method of annotating a detected object includes classifying a class of the object, generating a bounding box including a first quadrangle and a second quadrangle both sharing one side, for the object based on the class of the object, and generating an annotation on the object in units of the bounding box.

The method may further include determining attributes of the object, and the generating of the annotation may include generating an annotation regarding the class of the object and the attributes of the object, in units of the bounding box.

In the method, the class of the object may be any one of ‘car’, ‘van’, ‘truck’, ‘two-wheeled vehicle’, ‘pedestrian’, ‘emergency vehicle’, or ‘etc.’.

In the method, in a case where the object is a car designed to transport goods and is loaded with another vehicle, a class of the other vehicle may not be classified.

In the method, the generating of the bounding box may include generating the bounding box by applying different criteria depending on the classified class of the object.

In the method, the first quadrangle may be a rectangle, and the second quadrangle may be a trapezoid.

In the method, the first quadrangle may correspond to a front or a rear of the object, and the second quadrangle may correspond to a left side or a right side of the object.

In the method, in a case where an upper surface of the object is exposed, the first quadrangle or the second quadrangle may include the upper surface of the object.

In the method, in a case where the object is a wheeled vehicle, the second quadrangle may include a line segment connecting wheel-ground points to each other.

In the method, in a case where the class of the object is ‘two-wheeled vehicle’ or ‘pedestrian’, a width of the first quadrangle may be generated to be equal to a width of a shoulder of a person included in the object.

The method may further include, in a case where the detected object is a vehicle and a proportion of the object visible in image data is less than a threshold proportion of a total size of the object, determining not to generate the bounding box.

In the method, the attributes of the object may include visibility, a movement state, a lane position, a major state, a size and a subclass of the object.

The method may further include controlling an ego vehicle based on the generated annotation.

According to an aspect of another embodiment, a device for annotating a detected object includes a memory storing at least one program, and a processor configured to execute the at least one program to classify a class of the object, generate a bounding box including a first quadrangle and a second quadrangle both sharing one side, for the object based on the class of the object, and generate an annotation on the object in units of the bounding box.

According to an aspect of another embodiment, a method of generating an outline of an object includes recognizing at least one object included in a first image obtained while driving, generating a first outline for each recognized object, extracting the recognized object from the first image based on the generated first outline, obtaining first coordinate values for the second outline of the extracted object as a result of inputting the extracted object into a first learning model, and merging the object to which the second outline is applied, with the first image based on the obtained first coordinate values.

The method may further include calculating second coordinate values for a position of the extracted object in the first image, and calculating third coordinate values, which are values for coordinates of the second outline, based on the second coordinate values, and the merging with the first image may include merging the object to which the second outline is applied, with the first image further considering the obtained third coordinate values.

In the method, the first coordinate values may include 7 coordinate values.

In the method, the first coordinate values may include 8 coordinate values.

In the method, the first outline may have a polygonal shape.

In the method, the first outline may have a rectangular shape.

In the method, the first outline may be generated as a result of inputting the first image into a second learning model.

In the method, the second outline may have a shape of a cuboid.

In the method, the second outline may have a quadrangular shape.

In the method, the second outline may have a shape including two polygons.

In the method, any one of the two polygons may represent the front or rear of the object, and the other may represent a side of the object.

In the method, the second outline may have a shape in which two polygons are combined based on at least one common side.

In the method, the second outline may have a shape including a rectangle and a trapezoid.

In the method, a standard of the first outline may include a standard of the second outline.

According to an aspect of another embodiment, a device for generating an outline of an object includes a memory storing at least one program, and a processor configured to execute the at least one program to recognize at least one object included in a first image obtained while driving, generate a first outline for each recognized object, extract the recognized object from the first image based on the generated first outline, obtain first coordinate values for the second outline of the extracted object as a result of inputting the extracted object into a first learning model, and merge the object to which the second outline is applied, with the first image based on the obtained first coordinate values.

According to an aspect of another embodiment, a method of obtaining a cuboid includes recognizing at least one object included in a first image obtained while driving and generating a first outline for each recognized object, extracting first coordinate values constituting the generated first outline from the first image, and obtaining coordinates of a cuboid of the recognized object based on the recognized object and the extracted first coordinate values.

In the method, the first outline may be a bounding box for the recognized object.

In the method, the cuboid may be a sign that visually indicates information about the height, width, and depth of the recognized object.

In the method, the cuboid may include side points indicating a side of the recognized object.

In the method, the side points may include two points vertically arranged.

In the method, the cuboid may include a rear sign indicating the rear of the recognized object.

In the method, the cuboid may include an exposure sign indicating the degree of exposure of the recognized object.

In the method, the cuboid may include at least one of side points indicating a side of the recognized object, a rear sign indicating the rear of the recognized object, and an exposure sign indicating the degree of exposure of the recognized object.

In the method, the obtained cuboid may include a rear sign indicating the rear of the recognized object, and when the direction of the recognized object is a front-only direction, the rear sign may be a line that divides the exact center of the recognized object and extends in the vertical direction.

In the method, the length of the rear sign may equal to the height of the first outline.

In the method, the obtained cuboid may include a rear sign indicating the rear of the recognized object, and when the direction of the recognized object is the rear-only direction, the rear sign may coincide with the first outline.

In the method, the obtained cuboid may include side points indicating a side of the recognized object and a rear sign indicating the rear of the recognized object, and when the direction of the recognized object is a direction in which only the front and a side of the recognized object are visible, the length of the line connecting the side points is equal to the height of the first outline, and the rear sign may be limited to a line that shares at least part of the left or right side of the first outline.

In the method, the obtained cuboid may include side points indicating a side of the recognized object and a rear sign indicating the rear of the recognized object, and when the direction of the recognized object is a direction in which only a side and the rear of the recognized object are visible, the length of the line connecting the side points may be limited to the length of part of the left of right side of the first outline, and the rear sign may be expressed as a quadrangle that shares the right side of the first outline.

In the method, the obtained cuboid may include side points indicating a side of the recognized object and a rear sign indicating the rear of the recognized object, and when the direction of the recognized object is a direction in which only the left or right side of the recognized object is visible, the length of the line connecting the side points is equal to the height of the first outline, and the rear sign may be limited to a line that shares the left or right side of the first outline.

According to an aspect of another embodiment, a device for obtaining a cuboid includes a memory storing at least one program, and a processor configured to execute the at least one program to recognize at least one object included in a first image obtained while driving, generate a first outline for each recognized object, extract first coordinate values constituting the generated first outline from the first image, and obtain coordinates of a cuboid of the recognized object based on the recognized object and the extracted first coordinate values.

According to an aspect of another embodiment, a method of correcting a visual sign includes inputting an image obtained while driving into a learning model and generating a visual sign for the position and direction of an object detected from the image, performing first correction to move the position of the generated visual sign to the inside of an outline of the object, and performing second correction to change at least one of the position and shape of the visual sign moved to the inside of the outline, based on the characteristics of the visual sign.

In the method, the outline may be a bounding box for the recognized object.

In the method, the visual sign may be a cuboid that visually indicates information about the height, width, and depth of the recognized object.

In the method, the visual sign may include side points indicating a side of the recognized object.

In the method, the visual sign may include a rear sign indicating the rear of the recognized object.

In the method, the visual sign may include an exposure sign indicating the degree of exposure of the recognized object.

In the method, the performing of the first correction may include moving the position of the generated visual sign to the inside of the outline of the object and identifying the direction of the recognized object, and the performing of the second correction may include performing the second correction further considering the identified direction of the object.

In the method, the performing of the first correction may include identifying the direction of the recognized object and then moving the position of the generated visual sign to the inside of the outline of the object, and the performing of the second correction may include performing the second correction further considering the identified direction of the object.

In the method, the performing of the first correction may include moving a visual sign located outside the outline among the generated visual sign to the inside of the outline.

In the method, the performing of the first correction may include moving a visual sign located outside the outline among the generated visual sign to a boundary of the outline.

In the method, the performing of the first correction may include moving a visual sign located outside the outline to the closest point among a plurality of points constituting the outline.

In the method, the performing of the second correction may include, when the visual sign is a rear sign, changing the position and shape of the visual sign to a box corresponding to the area of the rear of the recognized object.

In the above method, the performing of the second correction may include, when the visual sign is a rear sign, changing the shape of the visual sign to a line corresponding to the height of the rear of the recognized object.

According to an aspect of another embodiment, a device for correcting a visual sign includes a memory storing at least one program, and a processor configured to execute the at least one program to inputting an image obtained while driving into a learning model and generating a visual sign for the position and direction of an object detected from the image, performing first correction to move the position of the generated visual sign to the inside of an outline of the object, and performing second correction to change at least one of the position and shape of the visual sign moved to the inside of the outline, based on the characteristics of the visual sign.

According to an aspect of another embodiment, provided is a computer-readable recording medium having recorded thereon a program for executing at least one of the methods described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
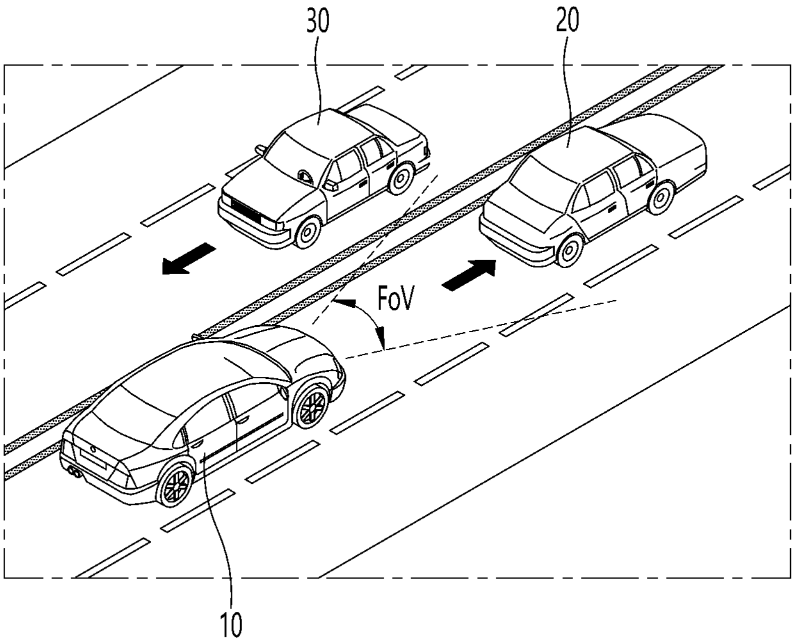
FIGS. 1 to 3 are diagrams for describing an autonomous driving method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

The terms used in the present application are merely used to describe example embodiments, and are not intended to limit the present disclosure. Singular forms are intended to include plural forms as well, unless the context clearly indicates otherwise. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" are used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the term 'vehicle' may refer to all types of transportation instruments with engines that are used to move passengers or goods, such as cars, buses, motorcycles, kick scooters, or trucks.

Hereinafter, the present disclosure will be described in detail with reference to the accompanying drawings.

Referring to FIG. 1, an autonomous driving device according to an embodiment of the present disclosure may be mounted on a vehicle to implement an autonomous vehicle 10. The autonomous driving device mounted on the autonomous vehicle 10 may include various sensors (including cameras) configured to collect situational information around the autonomous vehicle 10. For example, the autonomous driving device may detect a movement of a preceding vehicle 20 traveling in front of the autonomous vehicle 10, through an image sensor and/or an event sensor mounted on the front side of the autonomous vehicle 10. The autonomous driving device may further include sensors configured to detect, in addition to the preceding vehicle 20 traveling in front of the autonomous vehicle 10, another traveling vehicle 30 traveling in an adjacent lane, and pedestrians around the autonomous vehicle 10.

At least one of the sensors configured to collect the situational information around the autonomous vehicle may have a certain field of view (FoV) as illustrated in FIG. 1. For example, in a case where a sensor mounted on the front side of the autonomous vehicle 10 has a FoV as illustrated in FIG. 1, information detected from the center of the sensor may have a relatively high importance. This may be because most of information corresponding to the movement of the preceding vehicle 20 is included in the information detected from the center of the sensor.

The autonomous driving device may control the movement of the autonomous vehicle 10 by processing information collected by the sensors of the autonomous vehicle 10 in real time, while storing, in a memory device, at least part of the information collected by the sensors.

Figure 2:
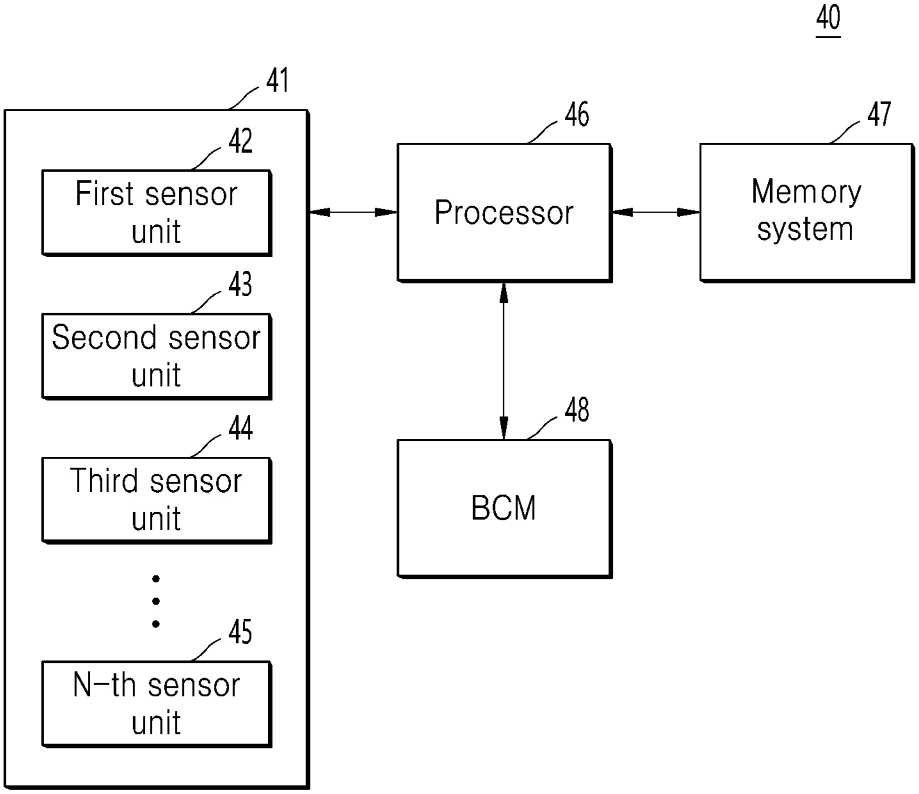

Referring to FIG. 2, an autonomous driving device 40 may include a sensor unit 41, a processor 46, a memory system 47, a body control module 48, and the like. The sensor unit 41 may include a plurality of sensors (including cameras) 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine the movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

Figure 3:
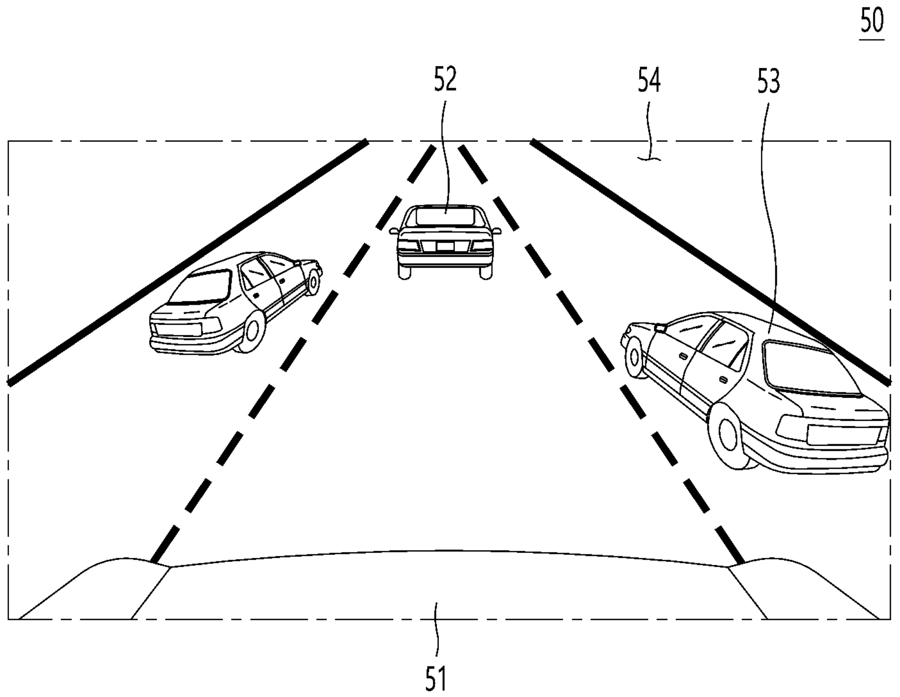

FIG. 3 is a diagram illustrating an example of image data obtained by sensors (including cameras) of an autonomous vehicle on which an autonomous driving device is mounted. Referring to FIG. 3, image data 50 may be data obtained by a sensor mounted on the front side of the autonomous vehicle. Thus, the image data 50 may include a front area 51 of the autonomous vehicle, a preceding vehicle 52 traveling in the same lane as the autonomous vehicle, a traveling vehicle 53 around the autonomous vehicle, a background 54, and the like.

In the image data 50 according to the embodiment illustrated in FIG. 3, data regarding a region including the front area 51 of the autonomous vehicle and the background 54 may be unlikely to affect the driving of the autonomous vehicle. In other words, the front area 51 of the autonomous vehicle and the background 54 may be regarded as data having a relatively low importance.

On the other hand, the distance to the preceding vehicle 52 and a movement of the traveling vehicle 53 to change lanes or the like may be significantly important factors in terms of safe driving of the autonomous vehicle. Accordingly, data regarding a region including the preceding vehicle 52 and the traveling vehicle 53 in the image data 50 may have a relatively high importance in terms of the driving of the autonomous vehicle.

A memory device of the autonomous driving device may apply different weights to different regions of the image data 50 received from a sensor, and then store the image data 50. For example, a high weight may be applied to the data regarding the region including the preceding vehicle 52 and the traveling vehicle 53, and a low weight may be applied to the data regarding the region including the front area 51 of the autonomous vehicle and the background 54.

Hereinafter, operations according to various embodiments may be understood as being performed by the autonomous driving device or the processor included in the autonomous driving device.

A device for annotating a detected object according to various embodiments of the present disclosure may be substantially the same as the autonomous driving device, may be included in the autonomous driving device, or may be a component implemented as part of a function performed by the autonomous driving device.

The device for annotating a detected object of the present disclosure may classify the class of a detected object. The device for annotating a detected object of the present disclosure may generate a bounding box for the object based on the classified class of the object. The device for annotating a detected object of the present disclosure may generate an annotation for the object in units of generated bounding boxes. Hereinafter, a method, performed by the device for annotating a detected object, of annotating a detected object will be described in detail.

The device for annotating a detected object of the present disclosure may classify the class of a detected object.

In an embodiment, in order to classify the class of the object, the device for annotating a detected object may receive an input of data. For example, the input data may be image data collected by a camera, but is not limited thereto and may include various types of data such as images, text, or voice.

In an embodiment, the device for annotating a detected object may include a classifier, and the classifier may calculate a probability that the input data is classified as a particular class. Through the probability calculation of the classifier, the device for annotating a detected object may classify the class of an object included in the input data. In addition, the classifier may be trained based on training data, and may be trained such that an error between a result output from the classifier and ground truth.

In the present disclosure, the device for annotating a detected object may classify a detected object as any one of a plurality of classes.

In an embodiment, the plurality of classes may be described with reference to Table 1 below.

TABLE 1

| Passenger car |
| --- |
| Van |
| Truck |
| Two-wheeled vehicle |
| Pedestrian |
| Emergency vehicle |
| etc. |

Among the plurality of classes in Table 1, 'Passenger car' may correspond to vehicles designed to transport a few passengers. For example, sedans, sport utility vehicles (SUVs), taxis, and the like may be classified as passenger vehicles.

Among the plurality of classes in Table 1, 'Van' may correspond to vehicles designed to transport a number of passengers. For example, 16-seater cars, buses, and the like may be classified as vans.

Among the plurality of classes in Table 1, 'Truck' may correspond to vehicles designed to transport goods. In a case where a vehicle designed to transport goods is loaded with other vehicles including heavy equipment vehicles, the vehicle designed to transport goods and the other vehicles may be regarded as one vehicle and classified as a truck. That is, the device for annotating a detected object does not classify the classes of the other vehicles loaded on the vehicle designed to transport goods.

Among the plurality of classes in Table 1, 'Two-wheeled vehicle' may correspond to vehicles that run on two wheels and passengers thereof. For example, motorcycles, scooters, mopeds, bicycles, segways, and the like may be classified as two-wheeled vehicles. Strollers and hand trucks may also be classified as two-wheeled vehicles.

Among the plurality of classes in Table 1, 'Pedestrian' may correspond to people traveling on foot.

Among the plurality of classes in Table 1, 'Emergency vehicle' refers to vehicles designed for special purposes, and may correspond to vehicles used in emergency situations. For example, vehicles equipped with sirens, such as police cars, fire trucks, or tow trucks, may be classified as emergency vehicles. For example, in a case where a vehicle that may be classified as another class, such as an unmarked police car, is equipped with a siren, the vehicle may be classified as an emergency vehicle only when the siren is operating.

Among the plurality of classes in Table 1, 'etc.' may correspond to vehicles that are not classified as the above classes. For example, three-wheel vehicles, forklifts, excavators, rickshaws, snowplows, bulldozers, road rollers, and the like may be classified as 'etc.'.

However, Table 1 above is provided as an example, and any suitable classification method may be applied.

In the present disclosure, the device for annotating a detected object may apply different annotation methods depending on the class of the object.

The device for annotating a detected object of the present disclosure may generate a bounding box for a detected object based on the classified class of the object.

In an embodiment, the bounding box may include two quadrangles. In detail, the device for annotating a detected object may generate a bounding box including a first quadrangle and a second quadrangle, which share one side, for the detected object based on the class of the object.

Figure 4:
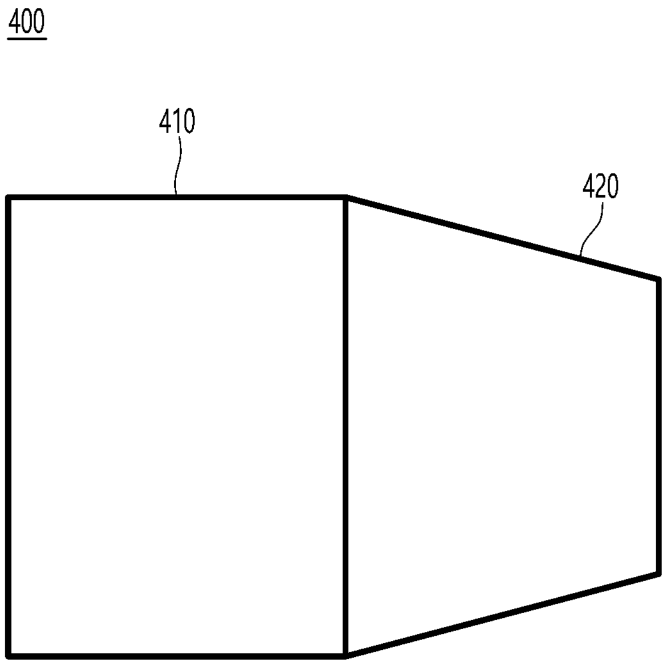
FIG. 4 is a diagram for describing a configuration of a bounding box according to an embodiment of the present disclosure.

FIG. 4 is a diagram for describing a configuration of a bounding box according to an embodiment of the present disclosure.

A bounding box 400 according to an embodiment of the present disclosure may include a first quadrangle 410 and a second quadrangle 420. By using the bounding box 400 of the form according to the present embodiment, the front, rear, and sides of an object indicated by two-dimensional image data may be specified separately from each other.

In an embodiment, the first quadrangle 410 may have a rectangular shape. That is, the first quadrangle 410 may include four sides that are perpendicular to adjacent line segments. In an embodiment, two sides of the first quadrangle 410 may be horizontal to the ground surface, and the other two sides of the first quadrangle 410 may be perpendicular to the ground surface.

In an embodiment, the second quadrangle 420 may have a trapezoidal shape. That is, two of the four sides of the second quadrangle 420 may be parallel to each other.

In an embodiment, the first quadrangle 410 and the second quadrangle 420 may share one side. In an embodiment, the side shared by the first quadrangle 410 and the second quadrangle 420 may be perpendicular to the ground surface.

In an embodiment, the first quadrangle 410 may correspond to the front or rear of a vehicle. In an embodiment, the second quadrangle 420 may correspond to the right or left side of the vehicle. Meanwhile, in a case where the top of the vehicle is exposed, the first quadrangle 410 or the second quadrangle 420 may be generated to include the top of the vehicle.

In the present disclosure, the bounding box including the first quadrangle 410 and the second quadrangle 420 may be appropriately generated according to various situations.

In an embodiment, the first quadrangle 410 may be generated to exclude side mirrors of the vehicle.

In an embodiment, in a case where the object is a wheeled vehicle, the second quadrangle 420 may be generated to include a line segment connecting wheel-ground points to each other.

In an embodiment, the first quadrangle 410 may be generated to be wider than the front or rear of the vehicle, i.e., to include portions of the sides of the vehicle, but not beyond the wheel-ground points.

In an embodiment, when a door of the vehicle is open, the bounding box 400 may be generated not to include the door.

In an embodiment, in a case where the size or length of equipment on the vehicle changes, for example, the vehicle is a ladder truck or a crane, or in a case where part of the vehicle moves separately, the bounding box 400 may be generated to include only part corresponding to the main body of the vehicle.

In an embodiment, when the vehicle tows another object with wheels, such as a cargo trailer, the bounding box 400 may be generated for each of the vehicle and the towed object. For example, when a tow vehicle tows another vehicle, the tow vehicle may be classified as the emergency vehicle class, the towed vehicle may be classified as the passenger car class, and the bounding box 400 may be generated for each of the tow vehicle and the other vehicle.

Figure 5A:
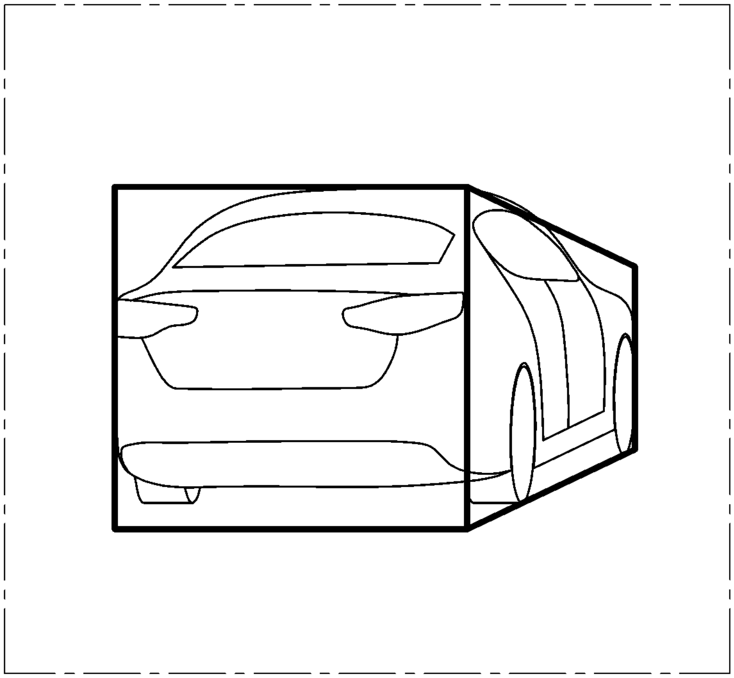
FIGS. 5A to 5C are diagrams for describing examples of bounding boxes generated for objects, according to an embodiment of the present disclosure.
Figure 5B:
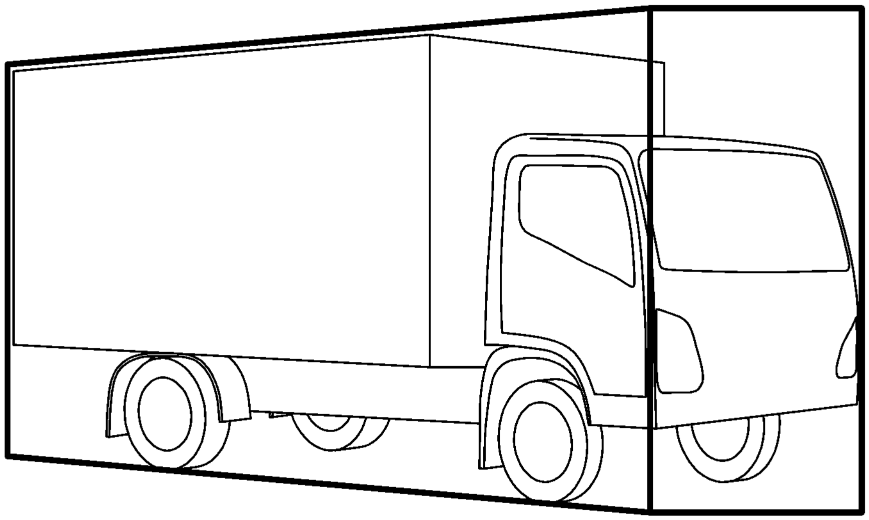
Figure 5C:
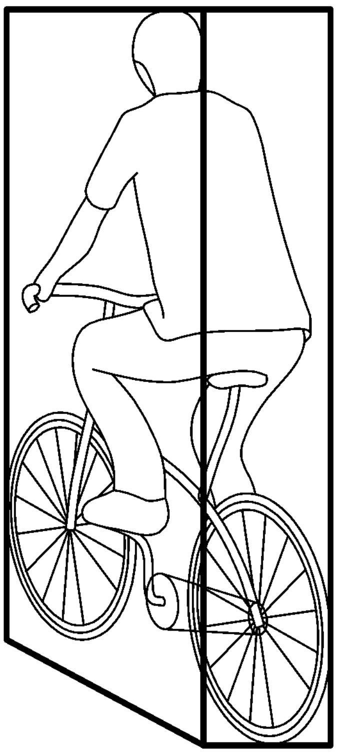

FIGS. 5A to 5C are diagrams for describing examples of bounding boxes generated for objects, according to an embodiment of the present disclosure.

FIG. 5A illustrates an example of a bounding box generated for a general object.

In FIG. 5A, a first quadrangle may be generated to correspond to the rear of a vehicle, and the width of the first quadrangle may correspond to the width of the rear of the vehicle. In FIG. 5A, a second quadrangle may be generated to include a line segment connecting wheel-ground points to each other. In FIG. 5A, the first quadrangle and the second quadrangle may be generated to share one line segment perpendicular to the ground surface and include images of the detected object.

In the present disclosure, the device for annotating a detected object may generate a bounding box by applying different criteria depending on the classified class of an object.

In an embodiment, in a case where the class of the object is 'Truck', 'Two-wheeled vehicle', or 'etc.', the height of the first quadrangle (i.e., the length of the side perpendicular to the ground surface) and the width of the second quadrangle (i.e., the length of the side horizontal to the ground surface) may be generated to include a cargo (e.g., luggage or freight) loaded on the object. In the present embodiment, the width of the first quadrangle (i.e., the length of the side horizontal to the ground surface) may be generated regardless of the loaded cargo.

Referring to FIG. 5B, a bounding box including a first quadrangle and a second quadrangle is generated for a vehicle that is a truck. The width of the first quadrangle corresponding to the front of the truck may be generated regardless of a cargo loaded on the truck. On the contrary, the second quadrangle may be generated to include a line segment extending from wheel-ground points, and the height of the first quadrangle and the width of the second quadrangle may be generated to include the cargo loaded on the truck.

In an embodiment, in a case where the class of the object is 'Two-wheeled vehicle', the width of the first quadrangle may be generated to correspond to a particular dimension of the body of a person included in the object. This is because, in a case where the class of the object is 'Two-wheeled vehicle', it is difficult to specify the width of the front or rear, or the width of the front or rear is significantly narrow. For example, the particular dimension of the body of the person may be the width of the shoulder of the person. In detail, in a case where the class of the object is 'Two-wheeled vehicle', the width of the first quadrangle may be equal to the width of the shoulder of the person, and the height of the first quadrangle may be equal to the height of the object including the vehicle and the person on the vehicle. Here, the second quadrangle may be generated on the right or left of the first quadrangle to include a side of the object.

Referring to FIG. 5C, a bounding box including a first quadrangle and a second quadrangle is generated for a bicycle on which a person is riding. The width of the first quadrangle corresponding to the rear of the bicycle may be generated to be equal to the width of the shoulder of the person on the bicycle. In addition, the height of the first quadrangle may be generated to be equal to the height of the object including the bicycle and the person. The second quadrangle may be generated on the left of the first quadrangle to include a side of the object.

In an embodiment, in a case where the class of the object is 'Pedestrian', the width of the first quadrangle may be generated to correspond to a particular dimension of the body of a person included in the object. This is because, in a case where the class of the object is 'Pedestrian', it is difficult to specify the width of the front or rear, or the width of the front or rear is significantly narrow, as in the case of 'Two-wheeled vehicle'. For example, the particular dimension of the body of the person may be the width of the shoulder of the person. In detail, in a case where the class of the object is 'Pedestrian', the width of the first quadrangle may be equal to the width of the shoulder of the person, and the height of the first quadrangle may be equal to the height of the person.

Meanwhile, in an embodiment, in a case where the class of the object is 'Two-wheeled vehicle' but there is no person on the object, the width of the first quadrangle 410 may be generated based on a stem or a fork.

In an embodiment, in a case where the class of the object is 'Pedestrian', a walking stick, a broom, a handbag, an umbrella, or the like carried by the person may not be included in the bounding box.

In the present disclosure, in a case where only part of an object is included in the image data, the device for annotating a detected object may determine whether to generate a bounding box, according to a condition.

In an embodiment, whether to generate a bounding box may be determined based on the proportion of the object visible in the image data. For example, in a case where the proportion of the vehicle visible in the image data is less than a threshold proportion (e.g., 30%) of the total size of the object, the device for annotating a detected object may determine not to generate a bounding box.

In an embodiment, whether to generate a bounding box may be determined based on the proportion of part of the object visible in the image data. For example, in a case where the proportion of a wheel of the vehicle visible in the image data is less than 50% of the size of the wheel of the vehicle, the device for annotating a detected object may determine not to generate a bounding box.

In an embodiment, whether to generate a bounding box may be determined based on the area occupied by a particular object in the image data. For example, in a case where an object classified as 'Van', 'Truck', or 'etc.' occupies more than 150 px in the image data, the device for annotating a detected object may determine to generate a bounding box.

In the present disclosure, by determining whether to generate a bounding box, applying a method of generating a bounding box, and the like differently according to various conditions, annotation for a detected object and safe and effective driving control of an ego vehicle may be achieved based on the annotation.

The device for annotating a detected object of the present disclosure may generate an annotation on an object in units of bounding boxes.

In an embodiment, the device for annotating a detected object may determine an attribute of an object in units of bounding boxes. In the present disclosure, an attribute of an object may refer to the nature of the object in its relationship with an ego vehicle, which is independent of the class of the object.

In an embodiment, attributes of an object that may be determined may be described with reference to Table 2 below.

TABLE 2

| Visibility |
| --- |
| Movement state |
| Lane position |
| Major state |
| Object size |
| Subclass |

In an embodiment, attributes of an object may include visibility of the object. In the present disclosure, the visibility may refer to an attribute related to the proportion of part of the object visible in the image data with respect to the entire object.

The visibility may be determined according to the proportion of part of the object visible in the image data. A criterion according to any suitable manner may be applied to determination of the visibility. For example, when the proportion of the object visible is at least 0% but less than 20%, the visibility may be determined as 'Level 1', when the proportion of the object visible is at least 20% but less than 40%, the visibility may be determined as 'Level 2', when the proportion of the object visible is at least 40% but less than 60%, the visibility may be determined as 'Level 3', when the proportion of the object visible is at least 60% but less than 80%, the visibility may be determined as 'Level 4', when the proportion of the object visible is at least 80% but less than 100%, the visibility may be determined as 'Level 5', and when the entire object is visible, the visibility may be determined as 'Level 6'.

In an embodiment, attributes of an object may include a movement state of the object. In the present disclosure, the movement state may refer to an attribute related to a movement of the object.

The movement state may be determined according to whether the object is moving. A criterion according to any suitable manner may be applied to determination of the movement state. For example, when the object is moving, the movement state may be determined as 'Moving', when the object is stationary but movable, the movement state may be determined as 'Stopped', and when the object is stationary and is not intended to move, the movement state may be determined as 'Parked'. In an embodiment, when it is detected that an object includes a person, determination of the movement state of the object may be limited to the states other than 'Parked'.

Depending on the movement state of the object, the ego vehicle may vary route settings or driving control. For example, when the movement state of an object in front is 'Stopped', the ego vehicle may be controlled to wait for a certain period of time, but when the movement state of the object in front is 'Parked', the ego vehicle may be controlled to move to avoid the object in front.

In an embodiment, attributes of an object may include a lane position of the object. In the present disclosure, the lane position may refer to information or an attribute related to a positional relationship with the ego vehicle.

In an embodiment, the lane position may be determined based on the relative position with the ego vehicle in units of lanes. For example, when the object is in the same lane as the ego vehicle, the lane position of the object may be '0'. For example, when the object is in any one of lanes on the right of the front of the ego vehicle, the lane position of the object may be a positive integer that is directly proportional to the distance between the lane of the ego vehicle and the lane of the object. For example, when the object is in the first lane on the right of the front of the ego vehicle (i.e., the closest lane among the lanes on the right), the lane position of the object may be '+1', when the object is in the second lane on the right, the lane position of the object may be '+2', and when the object is in the third lane on the right, the lane position of the object may be '+3'. On the contrary, when the object is in the first lane on the left of the front of the ego vehicle (i.e., the closest lane among the lanes on the left), the lane position of the object may be '−1', when the object is in the second lane on the left, the lane position of the object may be '−2', and when the object is in the third lane on the left, the lane position of the object may be '−3'.

In an embodiment, attributes of an object may include a major state of the object. In the present disclosure, the major state may refer to an attribute regarding whether the object affects driving of the ego vehicle.

For example, when the object is directly in front of the ego vehicle and may directly affect the driving of the ego vehicle, the major state may be 'Caution'. For example, when the object does not affect the driving of the ego vehicle at all, the major state may be 'No attention required'. For example, when there is a possibility that the object will affect the driving of the ego vehicle due to, for example, a sudden lane change, the major state may be 'Attention required'. For example, when the ego vehicle is in a lane adjacent to a sidewalk, the major state of a pedestrian on the sidewalk may be 'Attention required'.

In addition, median barriers, tubular markers, and the like may be considered in determination of the major state of an object. For example, even when the object is a vehicle driving next to the ego vehicle in an adjacent lane, the major state of the object may be 'No attention required'.

By determining the major state of an object, it is possible to differentiate the degrees of dependence of driving control on one or more detected objects. For example, an object whose major state is 'No attention required' may have no effect on driving control. For example, an object whose major state is 'Attention required' may affect driving control, and the ego vehicle may be controlled to respond sensitively to driving of the object (e.g., the speed or a lane change).

In an embodiment, attributes of an object may include the size of the object.

For example, the size of an object may be determined based on its relative size to the ego vehicle. For example, the size of an object may be determined based on size classification according to predetermined vehicle types. For example, the size of an object may be any one of 'Small', 'Medium', or 'Large'.

In an embodiment, attributes of an object may include a subclass of the object. In the present disclosure, a subclass of an object is a secondary class included in the class of the object, and may refer to an attribute for subdividing and distinguishing a particular class.

For example, in a case where the class of an object is 'Two-wheeled vehicle', subclasses of the object may include Rear_car, Electric_cart, Hand_truck, Three_wheels, and the like. For example, in a case where the class of an object is 'Pedestrian', subclasses of the object may include 'Standing', 'Carrying a load', 'Accompanying an animal', 'Holding an umbrella', and the like.

In the present disclosure, the device for annotating a detected object may generate an annotation by storing the class and attributes of an object in units of bounding boxes.

In the present disclosure, as attributes of an object are determined, a degree of risk or the like of the object based on a relationship with the ego vehicle may be evaluated. In addition, Table 2 above is provided as an example, and any appropriate attributes of an object may be assigned.

An object annotated by the device for annotating a detected object of the present disclosure may be used as a basis for controlling driving of an ego vehicle, and may also be used for training of an autonomous driving device.

Figure 6:
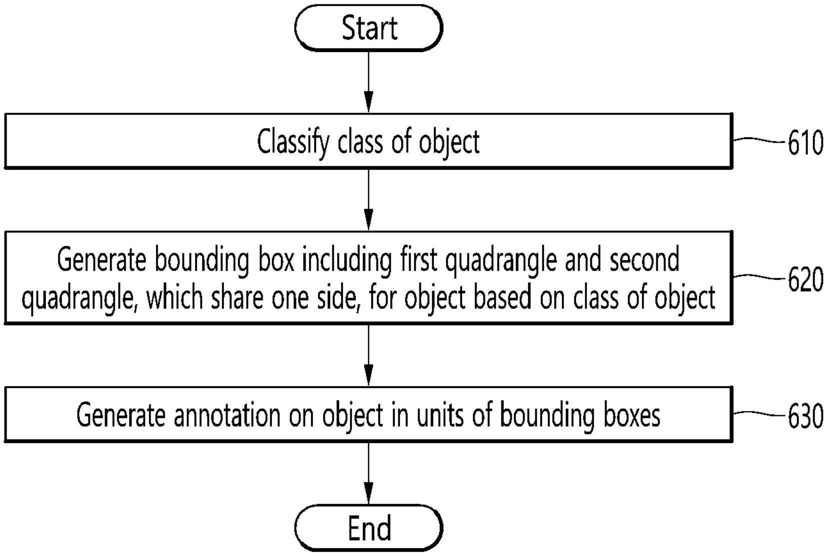
FIG. 6 is a flowchart of a method of annotating a detected object, according to an embodiment.

FIG. 6 is a flowchart of a method of annotating a detected object, according to an embodiment.

Operations illustrated in FIG. 6 may be performed by the device for annotating a detected object described above. In detail, the operations illustrated in FIG. 6 may be performed by a processor included in the device for annotating a detected object described above.

In operation 610, the device for annotating a detected object may classify the class of an object.

In an embodiment, the class of the object may be any one of 'Passenger car', 'Van', 'Truck', 'Two-wheeled vehicle', 'Pedestrian', 'Emergency vehicle', or 'etc.'.

In an embodiment, in a case where the object is a vehicle designed to transport goods and is loaded with another vehicle, the device for annotating a detected object may not classify the class of the loaded vehicle.

In operation 620, the device for annotating a detected object may generate a bounding box including a first quadrangle and a second quadrangle, which share one side, for the object based on the class of the object.

In an embodiment, operation 620 may be performed by applying different criteria depending on the classified class of the object.

In an embodiment, the first quadrangle may be a rectangle.

In an embodiment, the first quadrangle may correspond to the front or rear of the object.

In an embodiment, the second quadrangle may be a trapezoid.

In an embodiment, the second quadrangle may correspond to the left or right side of the object.

In an embodiment, when the top of the object is exposed, the first quadrangle or the second quadrangle may include the top of the object.

In an embodiment, in a case where the object is a wheeled vehicle, the second quadrangle may include a line segment connecting wheel-ground points to each other.

In an embodiment, in a case where the class of the object is 'Two-wheeled vehicle' or 'Pedestrian', the width of the first quadrangle may be generated to be equal to the width of the shoulder of a person included in the object.

In operation 630, the device for annotating a detected object may generate an annotation on the object in units of bounding boxes.

In an embodiment, the device for annotating a detected object may determine attributes of the object, and operation 630 may include generating an annotation on the class of the object and the attributes of the object in units of bounding boxes.

In an embodiment, the attributes of the object may include visibility, a movement state, a lane position, a major state, a size, and a subclass of the object.

In an embodiment, in a case where the detected object is a vehicle and the proportion of the object visible in the image data is less than a threshold proportion of the size of the entire object, the device for annotating a detected object may determine not to generate a bounding box.

In an embodiment, the device for annotating a detected object may control the ego vehicle based on the generated annotation.

Figure 7:
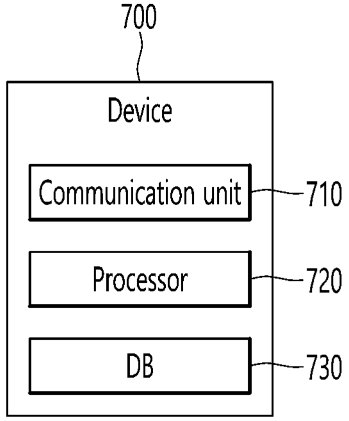
FIG. 7 is a block diagram of a device for annotating a detected object, according to an embodiment.

FIG. 7 is a block diagram of a device for obtaining a position of a stopped target, according to an embodiment.

Referring to FIG. 7, a device 700 for annotating a detected object may include a communication unit 710, a processor 720, and a database (DB) 730. FIG. 7 illustrates the device 700 for annotating a detected object, which includes only components related to an embodiment. Therefore, it would be understood by those of skill in the art that other general-purpose components may be further included in addition to those illustrated in FIG. 7.

The communication unit 710 may include one or more components for performing wired/wireless communication with an external server or an external device. For example, the communication unit 710 may include at least one of a short-range communication unit (not shown), a mobile communication unit (not shown), and a broadcast receiver (not shown).

The DB 730 is hardware for storing various pieces of data processed by the device 700 for annotating a detected object, and may store a program for the processor 720 to perform processing and control. The DB 730 may store payment information, user information, and the like.

The DB 730 may include random-access memory (RAM) such as dynamic RAM (DRAM) or static RAM (SRAM), read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 720 controls the overall operation of the device 700 for annotating a detected object. For example, the processor 720 may execute programs stored in the DB 730 to control the overall operation of an input unit (not shown), a display (not shown), the communication unit 710, the DB 730, and the like. The processor 720 may execute programs stored in the DB 730 to control the operation of the device 700 for annotating a detected object.

The processor 720 may control at least some of the operations of the device 700 for annotating a detected object described above with reference to FIGS. 1 to 6.

The processor 720 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the device 700 for annotating a detected object may be a mobile electronic device. For example, the device 700 for annotating a detected object may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the device 700 for annotating a detected object may be implemented as a wearable device having a communication function and a data processing function, such as a watch, glasses, a hair band, a ring, or the like.

In another embodiment, the device 700 for annotating a detected object may be an electronic device embedded in a vehicle. For example, the device 700 for annotating a detected object may be an electronic device that is manufactured and then inserted into a vehicle through tuning.

In another embodiment, the device 700 for annotating a detected object may be a server located outside a vehicle. The server may be implemented as a computer device or a plurality of computer devices that provide a command, code, a file, content, a service, and the like by performing communication through a network. The server may receive data necessary for determining a movement path of a vehicle from devices mounted on the vehicle, and determine the movement path of the vehicle based on the received data.

In another embodiment, a process performed by the device 700 for annotating a detected object may be performed by at least some of a mobile electronic device, an electronic device embedded in a vehicle, and a server located outside a vehicle.

Figure 8A:
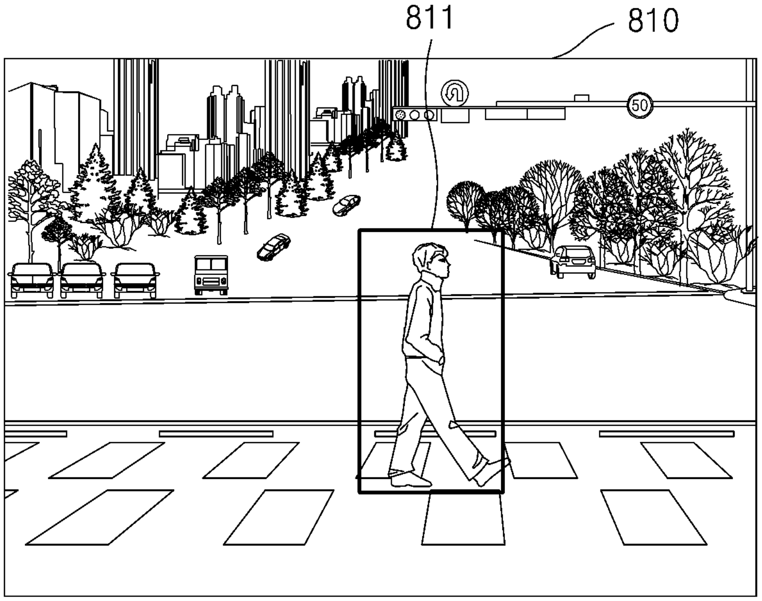
FIGS. 8A and 8B are diagrams associated with a camera configured to photograph the outside of a vehicle performing autonomous driving.
Figure 8B:
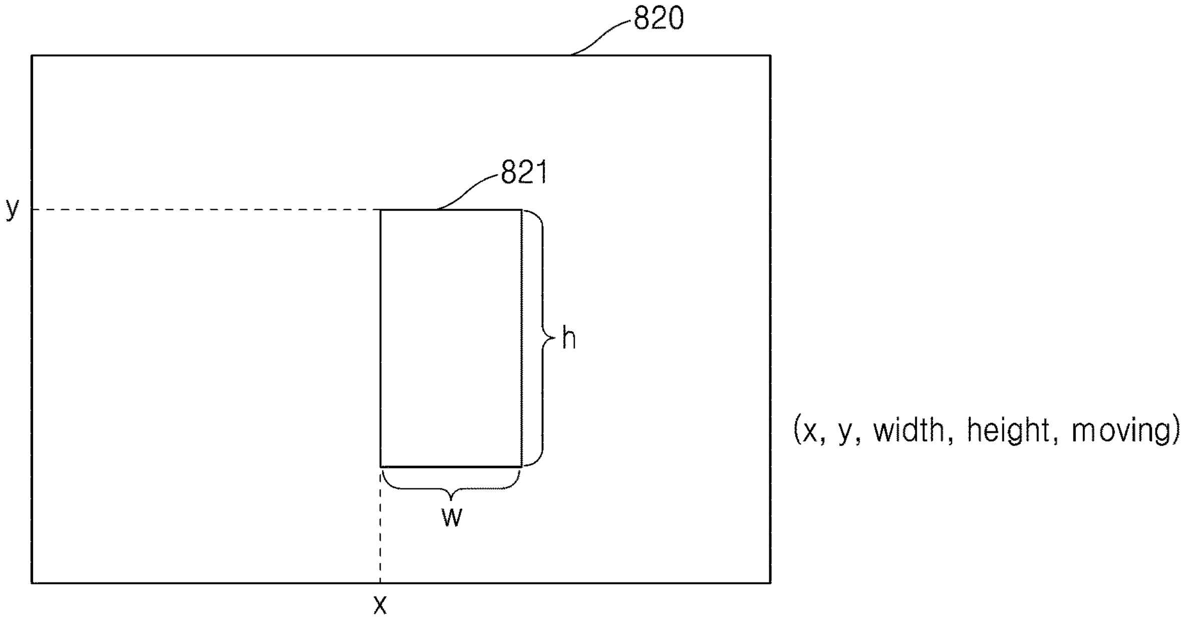

FIGS. 8A and 8B are diagrams associated with a camera configured to photograph the outside of a vehicle performing autonomous driving.

The camera may be mounted on the vehicle to photograph the outside of the vehicle. The camera may photograph front, side, and rear areas around the vehicle. An object outline generating device according to the present disclosure may obtain a plurality of images captured by the camera. The plurality of images captured by the camera may include a plurality of objects.

Information about an object includes object type information and object attribute information. Here, the object type information is index information indicating the type of object, and includes a group indicating a supercategory, and a class indicating a subcategory. In addition, the object attribute information indicates attribute information about the current state of an object, and includes movement information, rotation information, traffic information, color information, visibility information, and the like.

In an embodiment, groups and classes included in object type information may be as shown in Table 3 below, but are not limited thereto.

TABLE 3

| Group | Class |
|---|---|
| Flat | Road, Sidewalk, Parking, Ground, Crosswalk |
| Human | Pedestrian, Rider |
| Vehicle | Car, Truck, Bus |
| Construction | Building Wall, Guard rail, Tunnel, fence, gas station, pylon |
| Object | Pole, Traffic sign, Traffic light, color corn |
| Nature | vegetation, terrain, paddy field, river, lake |
| Void | Static |
| Lane | Dotted line, Solid line, Dotted and Solid line, Double Solid line |
| Sky | Sky |
| Animal | Dog, Cat, bird |

The movement information represents a movement of an object, and may be defined as ‘Stopped’, ‘Parked’, ‘Moving’, or the like. Object attribute information of a vehicle may be determined as ‘Stopped’, ‘Parked’, or ‘Moving’, object attribute information of a pedestrian may be determined as 'Moving', 'Stopped', or 'Unknown', and object attribute information of an immovable object, such as a traffic light, may be determined as 'Stopped', which is a default.

Rotation information represents the rotation of an object, and may be defined as 'Forward', 'Backward', 'Horizontal', 'Vertical', 'Lateral', or the like. Object attribute information of a vehicle may be determined as 'Front', 'Rear', or 'Side', and object attribute information of a horizontal or vertical traffic light may be determined as 'Horizontal' or 'Vertical'.

Traffic information is traffic-related information of an object, and may be defined as 'Instruction', 'Caution', 'Regulation', 'Auxiliary sign', or the like of a traffic sign. Color information is information about the color of an object, and may represent the color of an object, a traffic light, or a traffic sign.

Referring to FIG. 8A, an object 811 may be a pedestrian. An image 810 may have a certain size. A plurality of images 810 may include the same object 811, but as the vehicle travels along the road, the relative positions of the vehicle and the object 811 continuously change, and as the object 811 also moves over time, the position of the same object 811 in the image's changes.

Using all images to determine which object is the same in the images causes significant increases in the amount of data transmission and the amount of computation. Accordingly, it is difficult to perform processing through edge computing on an apparatus mounted on a vehicle, and it is also difficult to perform real-time analysis.

FIG. 8B illustrates a bounding box 821 included in an image 820. A bounding box is metadata about an object, and bounding box information may include object type information (e.g., group, class, etc.), information about a position on the image 820, size information, and the like.

Referring to FIG. 8B, the bounding box information may include information that the object 811 corresponds to a pedestrian class, information that the upper left vertex of the object 811 is at (x, y) on the image, information about the width and height of the object 811, and current state information that the object 811 is moving (i.e., movement information).

Figure 9:
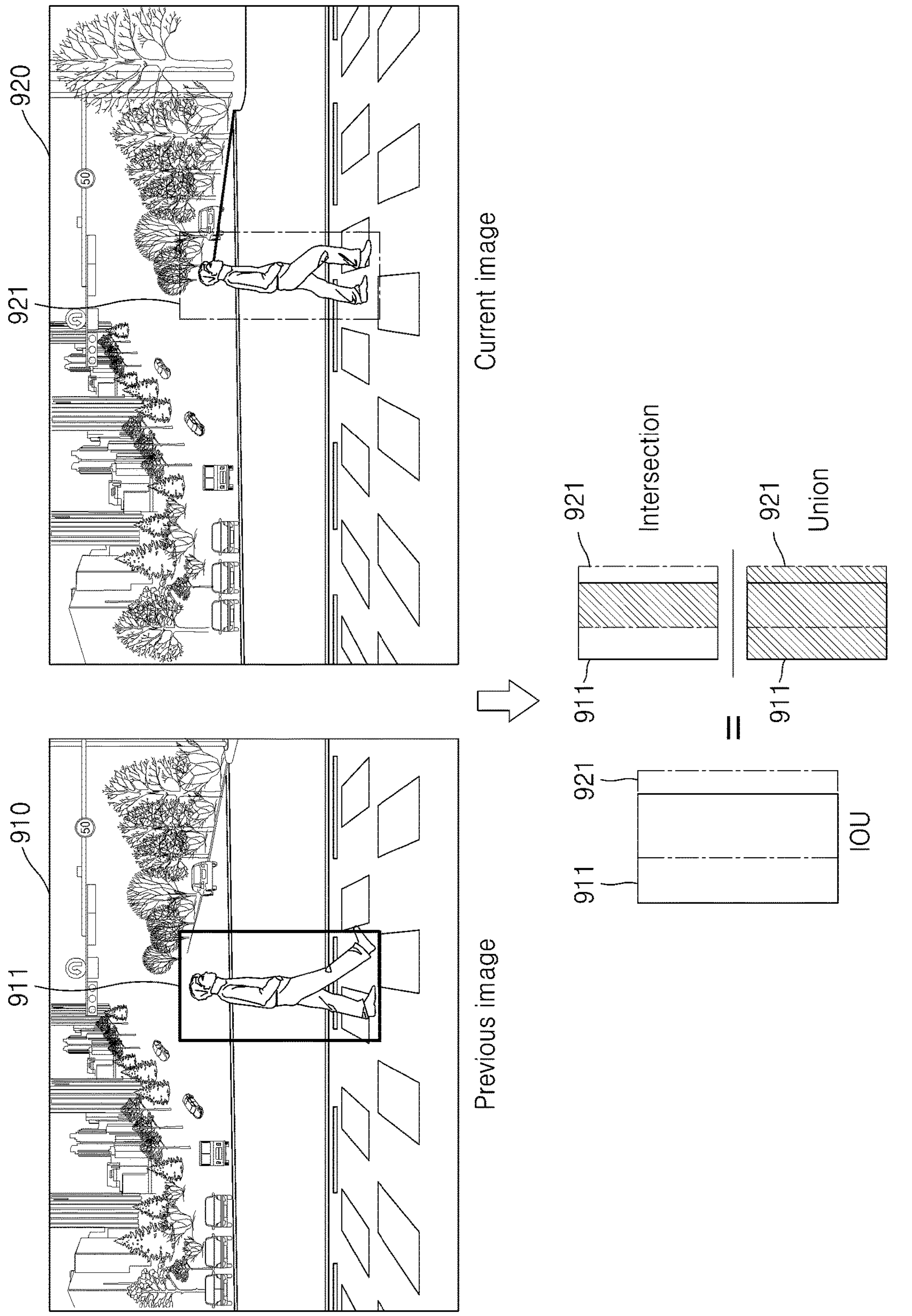
FIG. 9 is a schematic diagram for describing an object recognition method according to an embodiment.

FIG. 9 is a schematic diagram for describing an object recognition method according to an embodiment.

The object outline generating device according to the present disclosure may obtain a plurality of frames by dividing a video obtained from a camera into frames. The plurality of frames may include a previous frame 910 and a current frame 920. The object outline generating device may primarily analyze a frame to recognize an object included in the frame, and secondarily generate a bounding box corresponding to the recognized object, as described above with reference to FIGS. 8A and 8B. In the present disclosure, a bounding box refers to a line formed on the outside of an object to surround the object, and may be referred to as any one of a first outline and a second outline according to the context.

The object outline generating device may recognize a first pedestrian object 911 in the previous frame 910.

In an embodiment, the object outline generating device may divide a frame into grids having the same size, predict the number of bounding boxes designated in a predefined shape around the center of each grid, and calculate a confidence of the object based on a result of the predicting. The object outline generating device may determine whether an object is included in the frame or only a background is included in the frame, select a position having a high object confidence, and determine an object category, thereby recognizing the object. However, the method of recognizing an object in the present disclosure is not limited thereto.

The object outline generating device may obtain first position information of the first pedestrian object 911 recognized in the previous frame 910. As described above with reference to FIGS. 8A and 8B, the first position information may include coordinate information of any one vertex (e.g., the upper left vertex) of a bounding box corresponding to the first pedestrian object 911 on the previous frame 910, and horizontal and vertical length information.

In addition, the object outline generating device may obtain second position information of a second pedestrian object 921 recognized in the current frame 920.

The object outline generating device may calculate a similarity between the first position information of the first pedestrian object 911 recognized in the previous frame 910, and the second position information of the second pedestrian object 921 recognized in the current frame 920.

Referring to FIG. 9, the object outline generating device may calculate an intersection and a union between the first pedestrian object 911 and the second pedestrian object 921 by using the first position information and the second position information. The object outline generating device may calculate a value of an intersection area with respect to a union area, and based on the calculated value being greater than or equal to a threshold value, determine that the first pedestrian object 911 and the second pedestrian object 921 are the same pedestrian object.

However, the method of determining identity between objects is not limited to the above method.

Figure 10A:
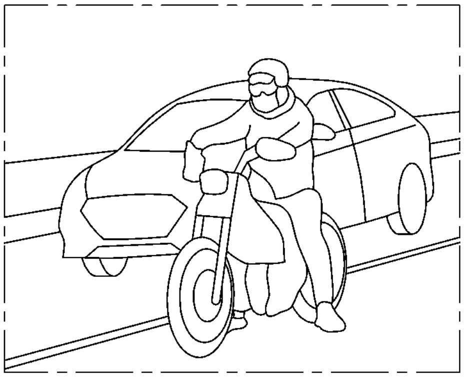
FIGS. 10A and 10B are diagrams for describing a process of generating a first outline in an operation of an object outline generating device.
Figure 10B:
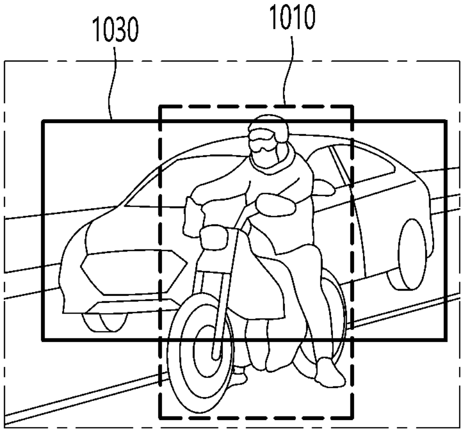

FIGS. 10A and 10B are diagrams for describing a process of generating a first outline in an operation of the object outline generating device.

FIG. 10A illustrates one frame (hereinafter, referred to as a "target frame") among several frames that constitute an image obtained while an autonomous vehicle is driving, and the target frame of FIG. 10A shows that a motorcycle is stopped close to the camera lens, and a passenger car is stopped behind the motorcycle.

FIG. 10B schematically illustrates that outlines are generated on the motorcycle and the passenger car in the target frame. The object outline generating device according to the present disclosure may analyze a frame, and when at least one object is recognized, output an outline of the object as output data by using data regarding the form, color, and shape of the object as input data for a learning model.

Here, the learning model may be a deep learning-based model, but is not limited thereto. The learning model is a model trained to receive an image as input data, recognize objects based on particular points of the objects included in the image, and generate outlines respectively surrounding the entire objects, and as a target frame of an image captured by the autonomous vehicle is input as test data for the learning model that has been completely trained, outlines may be generated on the objects included in the target frame.

For example, an outline generated around an object may be a polygon. As another example, an outline generated around an object may have a rectangular shape as illustrated in FIG. 10B, and the outline may be generated to include the entire recognized object without omission.

Information for generating an outline may be expressed as coordinates or coordinate values. A rectangular outline as illustrated in FIG. 10B may be generated by using only upper left coordinates and lower right coordinates of the rectangle. For example, when the upper left coordinates are (x1, y1) and the lower right coordinates are (x2, y2), it may be confirmed that lower left coordinates are (x1, y2) and upper right coordinates are (x2, y1) based on the morphological characteristics of the rectangle. That is, coordinates of a total of two points need to be confirmed to generate an outline, and a total of four coordinate values (x1, x2, y1, y2) need to be confirmed.

According to an embodiment, an outline of an object recognized in a target frame may be determined by a user input. In detail, in a case where an image captured by an autonomous vehicle includes a target frame in which an object is recognized, the object outline generating device may selectively extract only the target frame and output it to a user terminal used by a user, and when the user recognizes the object and inputs an input for generating an outline, the outline may be confirmed based on the input of the user.

Hereinafter, the term 'first outline' is considered to refer to an outline generated around an object to extract the object immediately after the object is recognized in a target frame, as illustrated in FIG. 10B. That is, it may be said that FIG. 10B shows both a first outline 1010 of the motorcycle and a first outline 1030 of the passenger car.

Figure 11:
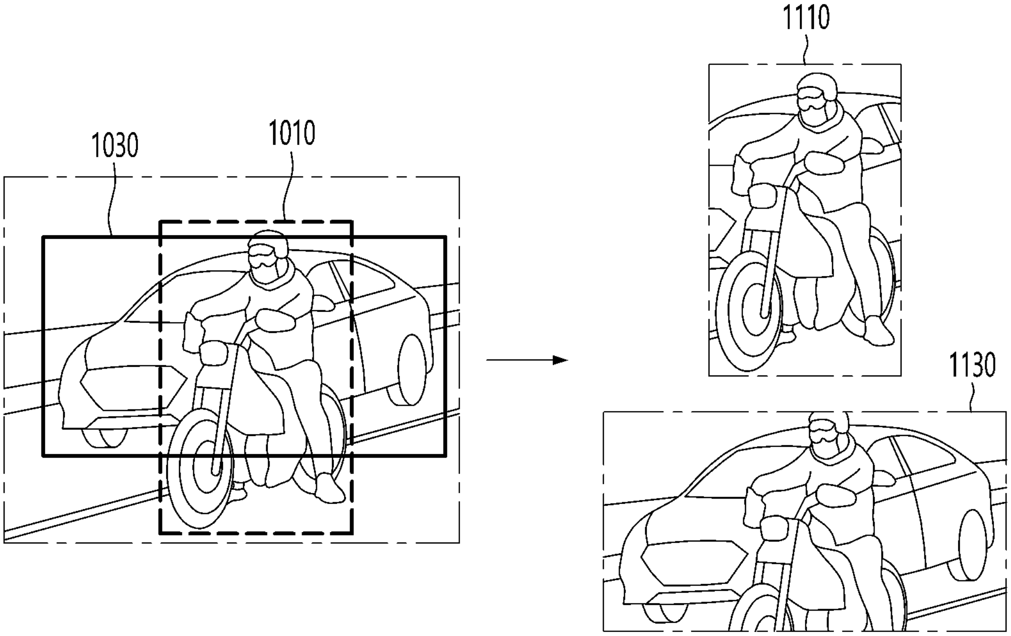
FIG. 11 is a diagram for describing a process in which an object outline generating device extracts an object surrounded by a first outline.

FIG. 11 is a diagram for describing a process in which the object outline generating device extracts an object surrounded by a first outline.

FIG. 11 will be described with reference to FIG. 10.

Based on the first outline 1010 of the motorcycle and the first outline 1030 of the passenger car of FIG. 10, the object outline generating device may extract the motorcycle and the passenger car from the target frame. The process in which the object outline generating device performs the extraction from the target frame based on the first outline 1010 of the motorcycle and the first outline 1030 of the passenger car may be referred to as a cropping process.

An extracted first object 1110 and an extracted second object 1130 have a lower resolution than the total resolution of the target frame, and by recognizing characteristics of an object through an automated process, dummy data that reduces accuracy may be minimized. The extracted first object 1110 and the extracted second object 1130 may be input to a learning model configured to output second outlines of a first object and a second object as result data. The term 'second outline' is a different concept from the term 'first outline' described above, and will be described below.

In the process of extracting the motorcycle and the passenger car from the target frame, the object outline generating device may identify and store the size (e.g., the width and height), absolute position information, and relative position information in the target frame, regarding the motorcycle and the passenger car, based on the coordinate values of the first outlines of the motorcycle and passenger car. Examples of utilization of coordinate values of first outlines, the size of an object, the position information of the object, and the relative position information in a target frame will be described below.

Figure 12A:
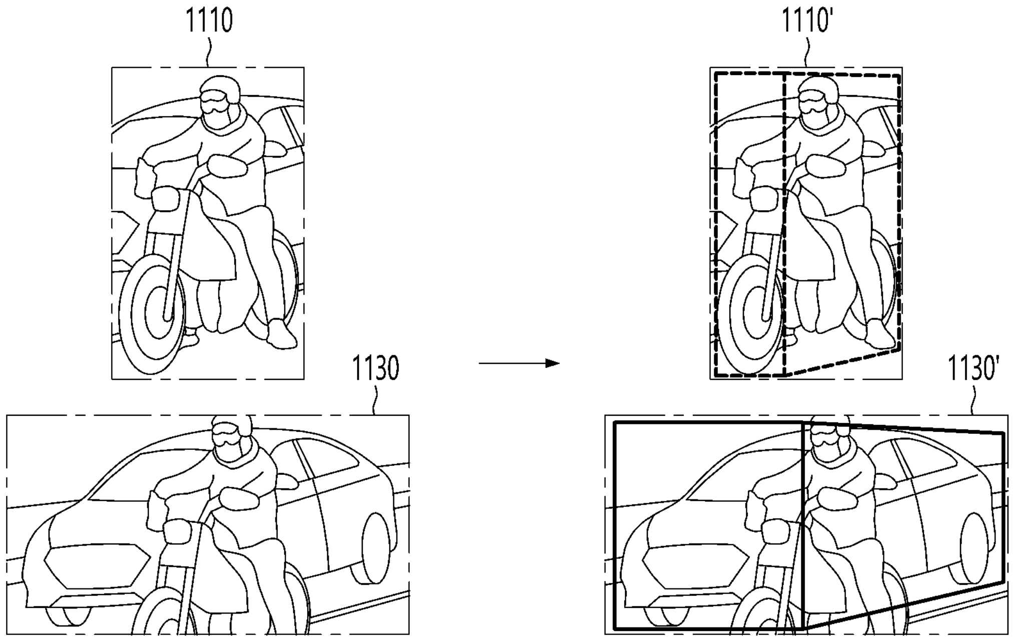
FIGS. 12A and 12B are diagrams for describing a process in which an object outline generating device generates a second outline for an object included in a target frame, and merges two different objects for which second outlines are generated into one.
Figure 12B:
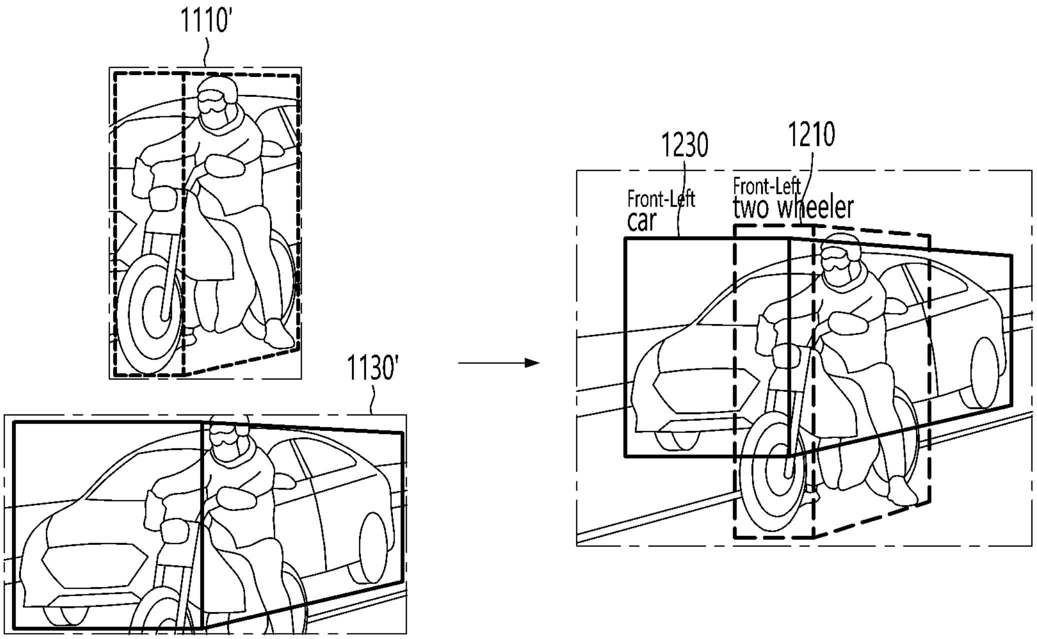

FIGS. 12A and 12B are diagrams for describing a process in which the object outline generating device generates a second outline for an object included in a target frame, and merges two different objects for which second outlines are generated into one.

In more detail, FIG. 12A is a diagram schematically illustrating that the object outline generating device generates second outlines for respective objects included in a target frame, and FIG. 12B is a diagram illustrating a result of generating second outlines for two different objects and then merging the second outlines into one.

The object outline generating device may input the extracted first object 1110 and the extracted second object 1130 into a learning model, and control the learning model to generate second outlines for the motorcycle and the passenger car as illustrated in FIG. 12A. Hereinafter, the motorcycle for which the second outline is generated, and the passenger car for which the second outline is generated will be referred to as a first object 1110' for which the second outline is generated, and a second object 1130' for which the second outline is generated, respectively.

Here, the learning model is a different model from the above-described learning model configured to generate a first outline, and for example, may be a deep learning model configured to receive an image of an extracted object as an input, and output a second outline for the object as output data. According to an embodiment, the learning model configured to generate a second outline may be a model using a machine learning technique other than deep learning.

Here, the term 'second outline' refers to a type of metadata that compressively expresses three-dimensional information of an object, considering that the object expressed in two dimensions is actually expressed as three-dimensional information. The autonomous vehicle may perform calculation of the distance to and perspective of an object that is gradually approaching or moving away from the autonomous vehicle, by recognizing the object surrounded by a second outline. In the present disclosure, a second outline may function as reference data for an autonomous vehicle to perform calculation of the distances to and perspectives of various objects as described above. The second outline also surrounds the object like the first outline, but includes more coordinates (or coordinate values) due to the characteristic of compressively expressing three-dimensional information.

Hereinafter, various embodiments of coordinate characteristics of the second outline and morphological characteristics of the second outline will be described.

For example, coordinate values of the second outline may include 7 coordinate values. In FIG. 12B, a second outline 1210 of the motorcycle has a shape in which a rectangle representing the front of the motorcycle and a trapezoid representing a side of the motorcycle are combined with each other based on one common side. Here, coordinates of vertices for generating the second outline 1210 of the motorcycle are upper left coordinates (x1, y1), upper middle coordinates (x2, y1), upper right coordinates (x3, y3), lower left coordinates (x1, y2), lower middle coordinates (x2, y2), and lower right coordinates (x3, y4), and there are a total of 7 coordinate values (x1, x2, x3, y1, y2, y3, and y4) that are minimum information required for generating the second outline 1210 of the motorcycle.

As another example, the second outline may include 8 coordinate values. Although not illustrated in FIG. 12B, in a case where the object is surrounded by a second outline in the shape of a cuboid to preserve the perspective of the object, coordinate values of a total of 8 points are required for generating the second outline of the object, and a total of 8 coordinate values (x1, x2, x3, x4, y1, y2, y3, and y4) are required.

The shape of the second outline may be a shape including two polygons. In particular, in the present embodiment, any one of the two polygons may represent the front or rear of the object, and the other polygon may represent a side of the object.

TABLE 4

| Shape No. | Left polygon | Right polygon | Interpretation of object movement |
|---|---|---|---|
| First shape | Rear | Right | The object on the right is getting further away |
| Second shape | Left | Rear | The object on the left is getting further away |
| Third shape | Front | Left | The object on the left is getting closer |
| Fourth shape | Right | Front | The object on the right is getting closer |

Table 4 shows an example of interpretations of object movements in a case where the shape of a second outline is a combination of two polygons in the horizontal direction based on one common side. The learning model has been trained based training data to receive an image of an object surrounded by a first outline as an input, and indicate the front and rear of the object as rectangles, and the left and right sides of the object as trapezoids whose parallel sides have different lengths.

Referring to FIG. 12B, it may be seen that 'Front-left' as metadata of the object is indicated on the second outline 1210 of the motorcycle, and below it, the second outline 1210 in the shape of a combination of a rectangle and a trapezoid respectively corresponding to the front and the left side of the motorcycle is located, and a second outline 1230 of the passenger car may also be generated in the same manner. The learning model generates a second outline for an object and calculates coordinate values of the second outline as numerical information for generating the second outline, and the calculated coordinate values of the second outline may be used to determine a position of the object when merging the object to which the second outline is applied, with an original image in the next operation.

As an embodiment of the present disclosure, it has already been described above that the shape of the second outline may be a cuboid, and in this case, a total of 8 coordinate values are required.

Although not listed in Table 4, in a case where only the front or rear of the object is included in an image captured by a camera mounted on the autonomous vehicle, or only a side of the object is included and both the front and the rear of the object is not included in the image, the second outline may have a quadrangular shape. That is, a second outline of an object whose only front or rear is included in the image may have a rectangular shape, and a second outline of an object whose only side is included but both front and rear are not included in the image may have the shape of a simple quadrangle that does not include any right angle.

In addition, the second outline may be a shape of a combination of two polygons based on at least one common side, which has been schematically described with reference to the second outline 1210 of the motorcycle and the second outline 1230 of the passenger car of FIG. 12B.

The specifications of the second outline may be included in the specifications of the first outline. In detail, because the learning model is trained to generate a second outline based on an image whose resolution is limited to a first outline, the specifications of the second outline may be automatically adjusted to be less than or equal to the specifications of the first outline.

As illustrated in FIG. 12B, after generating the second outlines of the respective extracted objects, the object outline generating device may merge objects 1210' and 1230' to which the second outlines are respectively applied, with the original image. For example, in a case where four objects are present in the target frame, a process of merging, with an original image, an object to which a second outline is applied may be repeated four times, and in a final image, the four objects to which the second outlines are respectively applied may be indicated at once along with a background where no objects are indicated. In other words, when the number of objects is n, the process of generating a second outline and merging it with the original image may be performed n times.

In the present disclosure, coordinate values for generating a second outline of an extracted object may be referred to as simply first coordinate values, coordinate values of the center of the object in an original image to refer to the extracted object may be referred to as simply second coordinate values, and coordinate values for generating a second outline of the object in the original image may be referred to as simply third coordinate values. After the first coordinate values for forming the second outline are determined, the object outline generating device may identify the position of the object in the original image through the second coordinate values and perform processing such that a second outline is generated around the second coordinate values in the original image, thereby merging the object to which the second outline is applied, with the original image.

According to the present disclosure, accurate annotation may be performed on each object through a process of primarily clearly setting a first outline for the object, then extracting the object to perform training to generate a second outline individually, and finally merging the second outline. That is, compared to a related-art method of three-dimensionally annotating an entire target frame at once, according to the present disclosure, the accuracy of annotation may be significantly increased.

Figure 13A:
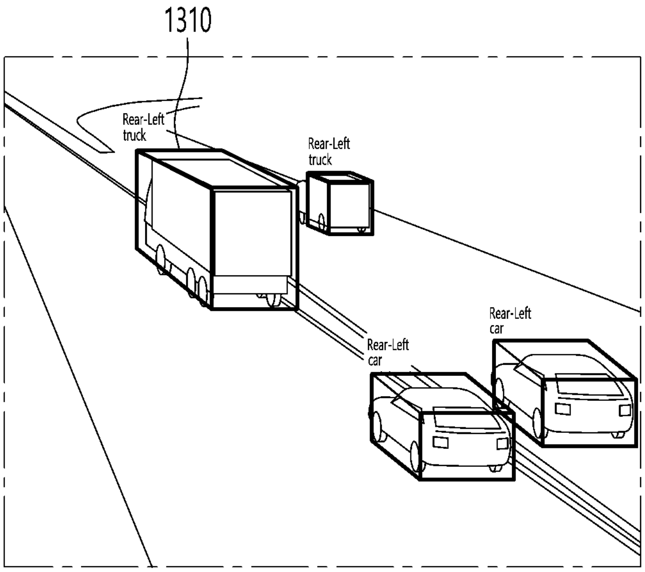
FIGS. 13A and 13B are diagrams for schematically describing an example in which second outlines are generated for respective objects and then merging of each second outline with an original image is repeatedly performed as many as the number of objects.
Figure 13B:
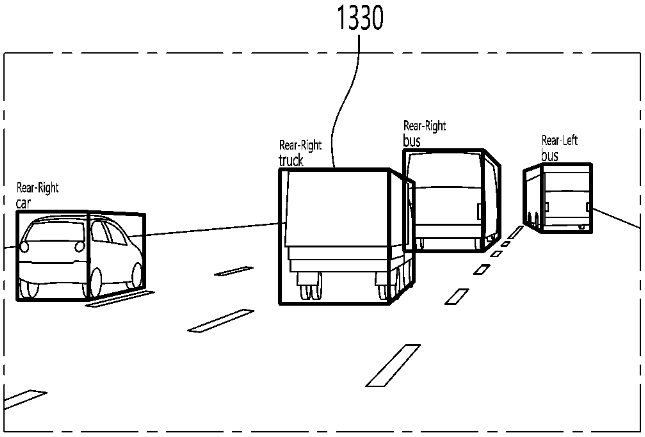

FIGS. 13A and 13B are diagrams for schematically describing an example in which second outlines are generated for respective objects and then merging of each second outline with an original image is repeatedly performed as many as the number of objects.

FIG. 13A and FIG. 13B illustrate original images each obtained by repeatedly performing a process of merging each of four objects with an original image four times. The number of objects in FIGS. 13A and 13B is 4, but according to an embodiment, the number of objects to be merged with the original image is not limited to 4 and may be more or fewer than 4.

FIG. 13A schematically illustrates a result of merging second outlines of the objects with the original image after the second outlines are generated in the shape of a cuboid. A three-dimensional cuboid is applied to a second outline 1310 of a first object of FIG. 13A, indicating that the first object is on the right of the autonomous vehicle that has captured the image, and is moving in the same direction as the autonomous vehicle.

In addition, FIG. 13B schematically illustrates a result of merging second outlines of the objects with the original image after the second outlines are generated in a shape of a combination of two polygons. In particular, the two polygons may be a rectangle and a trapezoid, and it may be seen that 'Rear-Right', and/or 'car', 'bus', or 'truck' as class information of the object are additionally indicated on the upper left corner of the second outline. A shape of a combination of two polygons is applied to a second outline 1330 of a second object of FIG. 13B, indicating that the second object is on the left of the autonomous vehicle that has captured the image, and is moving in the same direction as the autonomous vehicle.

Figure 14:
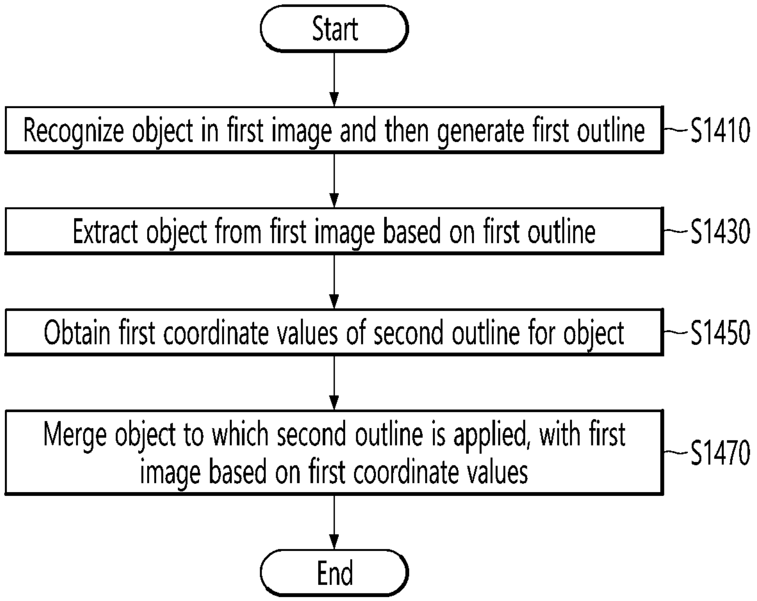
FIG. 14 is a flowchart of a method of generating an object outline, according to an embodiment illustrated in FIGS. 10 to 13.

FIG. 14 is a flowchart of a method of generating an object outline, according to the embodiment described above with reference to FIGS. 10 to 13.

The method of FIG. 14 may be implemented by the object outline generating device described above with reference to FIGS. 10 to 13, and thus, the descriptions provided above with reference to FIGS. 10 to 13 will be omitted.

First, the object outline generating device may recognize an object in a first image and perform processing through a learning model such that a first outline is generated for each object (S1410). The first outline may have a polygonal shape.

Next, the object outline generating device may extract the object from the first image based on the first outline (S1430). In more detail, the extracted object may be an image limited to the size area of the first outline, with the first outline as a boundary line.

The object outline generating device may obtain first coordinate values of a second outline for the object (S1450). According to an embodiment, the first coordinate values may include 7 coordinate values or 8 coordinate values.

The object outline generating device may merge the object to which the second outline is applied, with the first image based on the first coordinate values (S1470). As an alternative embodiment of operation S1470, the object outline generating device may calculate second coordinate values for a position of the extracted object in the original image (or the target frame) and calculate third coordinate values, which are values for coordinates of the second outline, based on the second coordinate values, and may implement the effect of merging the object to which the second outline is applied, with the original image considering both the first coordinate values and the third coordinate values.

Figure 15:
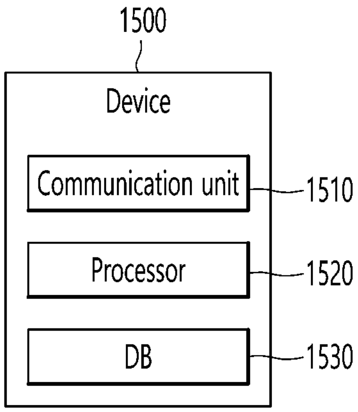
FIG. 15 is a block diagram of an object outline generating device according to an embodiment.

FIG. 15 is a block diagram of an object outline generating device according to an embodiment.

Referring to FIG. 15, an object outline generating device 1500 may include a communication unit 1510, a processor 1520, and a DB 1530. FIG. 15 illustrates the object outline generating device 1500 including only the components related to an embodiment. Therefore, it would be understood by those of skill in the art that other general-purpose components may be further included in addition to those illustrated in FIG. 15.

The communication unit 1510 may include one or more components for performing wired/wireless communication with an external server or an external device. For example, the communication unit 1510 may include at least one of a short-range communication unit (not shown), a mobile communication unit (not shown), and a broadcast receiver (not shown).

The DB 1530 is hardware for storing various pieces of data processed by the object outline generating device 1500, and may store a program for the processor 1520 to perform processing and control.

The DB 1530 may include RAM such as DRAM or SRAM, ROM, EEPROM, a CD-ROM, a Blu-ray or other optical disk storage, an HDD, an SSD, or flash memory.

The processor 1520 controls the overall operation of the object outline generating device 1500. For example, the processor 1520 may execute programs stored in the DB 1530 to control the overall operation of an input unit (not shown), a display (not shown), the communication unit 1510, the DB 1530, and the like. The processor 1520 may execute programs stored in the DB 1530 to control the operation of the object outline generating device 1500.

The processor 1520 may control at least some of the operations of the object outline generating device 1500 described above with reference to FIGS. 1 to 15.

For example, as described above with reference to FIGS. 10 to 14, the processor 1520 may recognize at least one object included in a first image obtained while driving, generate a first outline for each recognized object, extract the recognized object from the first image based on the generated first outline, obtain first coordinate values for the second outline of the extracted object as a result of inputting the extracted object into a first learning model, and merge the object to which the second outline is applied, with the first image based on the obtained first coordinate values. According to an embodiment, a final image generated by merging the object to which the second outline is applied, with the first image may be referred to as a second image to distinguish it from the first image.

The processor 1520 may be implemented by using at least one of ASICs, DSPs, DSPDs, PLDs, FPGAs, controllers, microcontrollers, microprocessors, and other electrical units for performing functions.

Figure 16A:
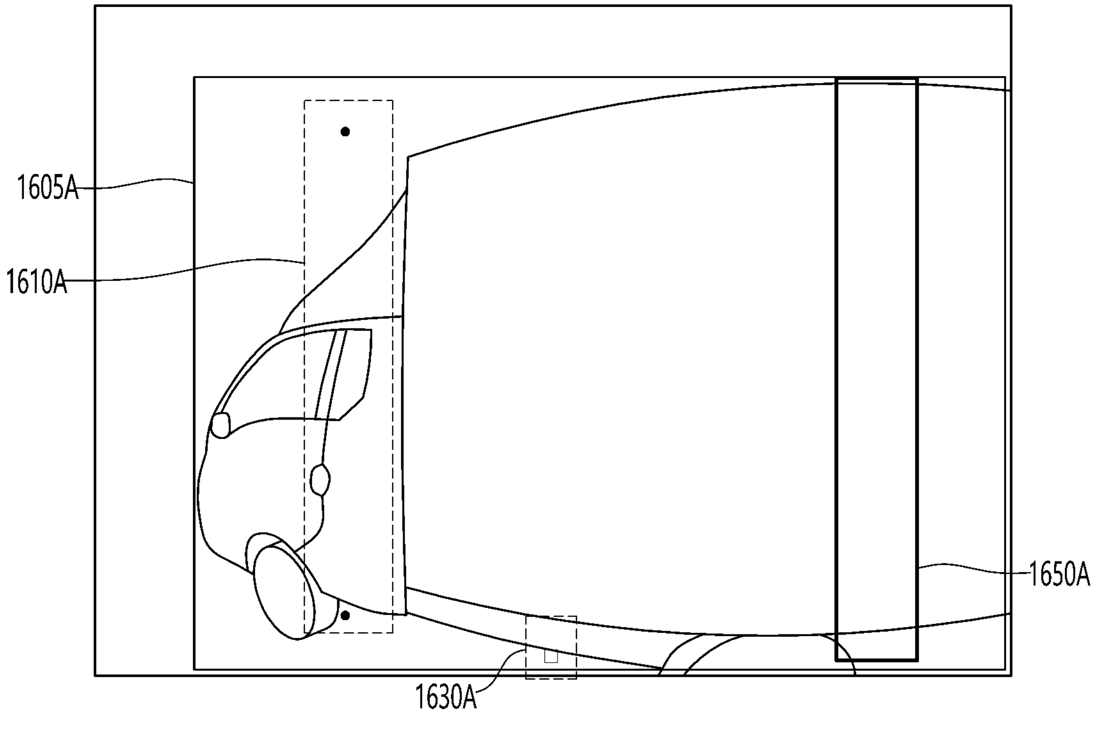
FIGS. 16A and 16B are diagrams schematically illustrating results when a method of obtaining a cuboid of an object in an image according to the present disclosure is and is not applied to an image obtained while driving, respectively.
Figure 16B:
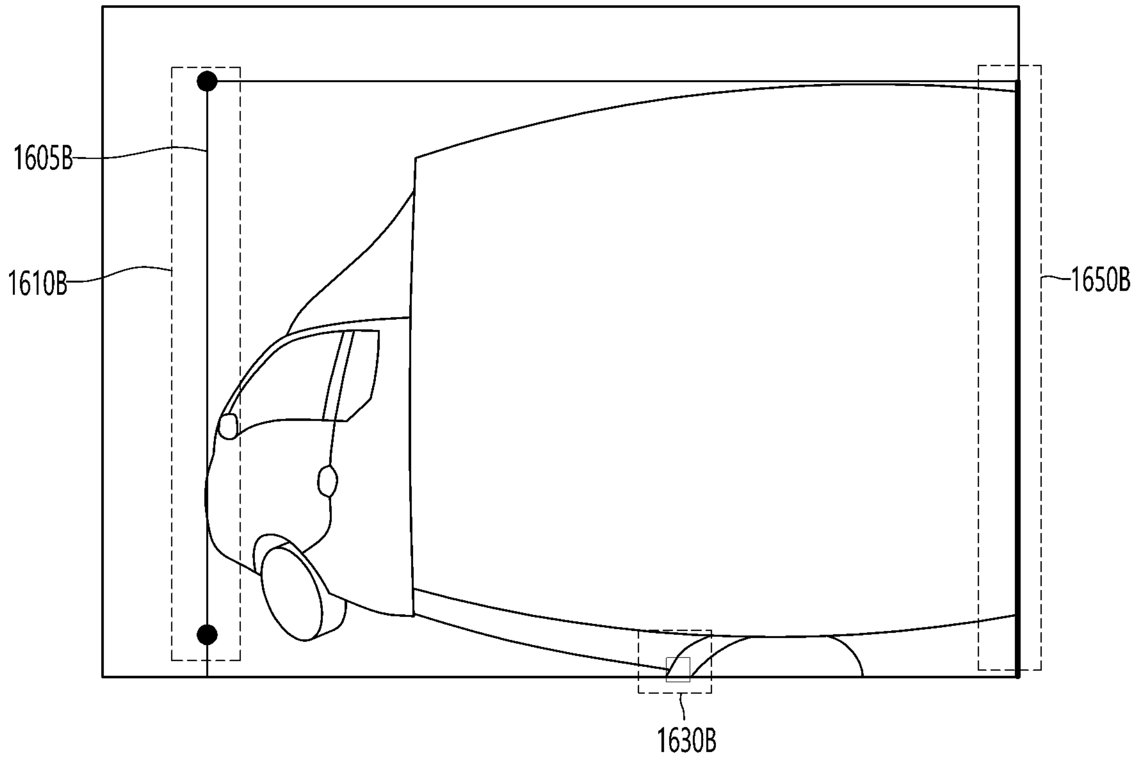

FIGS. 16A and 16B are diagrams schematically illustrating results when a method of obtaining a cuboid of an object in an image according to the present disclosure is and is not applied to an image obtained while driving, respectively.

Hereinafter, the method of obtaining a cuboid of an object in an image according to the present disclosure will be referred to as simply a cuboid obtaining method, and a device for obtaining a cuboid of an object in an image according to the present disclosure will be referred to as simply a cuboid obtaining device.

First, FIG. 16A illustrates a result when the cuboid obtaining method is not applied. In more detail, FIG. 16A schematically illustrates a cuboid of an object obtained when an image obtained while driving is input into a learning model as input data. In the present disclosure, the term 'cuboid' is an expanded concept of the dictionary definition of rectangular parallelepiped in the art, and refers to a sign that visually indicates information about the height, width, and depth of an object recognized in an image (or information including coordinates in the image). That is, a cuboid represents three-dimensional information of an object in an image expressed in two dimensions.

An object recognized in the image of FIG. 16A is a truck driving with a container box loaded thereon, and a cuboid in FIG. 16A includes a total of three figures. First, side points 1610A may be an example of a cuboid for intuitively indicating a side of the recognized object. In addition, an exposure sign 1630A may be an example of a sign indicating whether the object is fully exposed in the image. In addition, a rear sign 1650A may be an example of a cuboid for intuitively indicating the position of the rear of the recognized object.

In general, when an image is input into the learning model, cuboid coordinates of objects included in the image may be obtained as illustrated in FIG. 16A. The learning model is an improved form of neural network such as deep learning, and may be a model configured to perform learning on input images according to a preset loss function and output a result about annotation, and according to an embodiment, a machine learning algorithm different from a neural network algorithm may be applied thereto. Here, the obtained side points 1610A, exposure sign 1630A, and rear sign 1650A are not dependent on an outline 1605A of the object recognized in FIG. 16A, and are learned independently, and thus, coordinates constituting the outline 1605A do not affect coordinate values of the side points 1610A, the exposure sign 1630A, and the rear sign 1650A.

Meanwhile, according to the cuboid obtaining device according to the present disclosure, a cuboid as illustrated in FIG. 16B may be obtained. In detail, cuboid coordinates obtained through the learning model are dependent on an outline 1605B generated outside the object after the object is primarily recognized. In more detail, coordinates of side points 1610B, an exposure sign 1630B, and a rear sign 1650B in FIG. 16B all share coordinates and coordinate values of the outline 1605B generated outside the object in FIG. 16B. Here, sharing the coordinate values means that the side points 1610B, the exposure sign 1630B, and the rear sign 1650B are located on at least one of the four sides forming the outline 1605B.

Hereinafter, the definitions of side points, exposure sign, and rear sign included in a cuboid in the present disclosure will be described in detail.

Side points may represent a boundary between the front and a side of an object recognized in an image. Here, the term 'side' refers to a side of an object that may be identified through an image, and thus may refer to any one of the left side or the right side of the object. Side points include upper and lower points and a connection line connecting the two points, and the upper and lower points have the same x-coordinate and different y-coordinates. For example, the coordinates of the two points of the side points may be (x1, y1) and (x1, y2), respectively. The connection line may be determined immediately after the two points forming the side points are determined. Because the side points represent the boundary between the front and the side of the object, the length of the connection line of the side points may represent the height of the front of the object.

An exposure sign (lateral sign) may indicate the degree of exposure of an object recognized in an image, and may be expressed as a single large dot in the image, as illustrated in FIG. 16A or FIG. 16B. The exposure sign is an indicator of whether the object is completely exposed in the image. For example, when the entire object is completely captured in the image, the exposure sign is located at the lower center of the outline of the object, and when only part of the object is captured in the image, the exposure sign is located at an appropriate position, considering other part of the object that is not captured in the image. As another example, when only part of the object is captured in the image, the exposure sign may be omitted. In this case, the cuboid of the object includes only the side points and the rear sign described above.

A rear sign is an indicator of the position of the rear of an object in an image. According to an embodiment, the rear sign may be in the form of a line or a box. Changes in the shape of the rear sign will be described below with reference to FIGS. 18 to 25.

Figure 17:
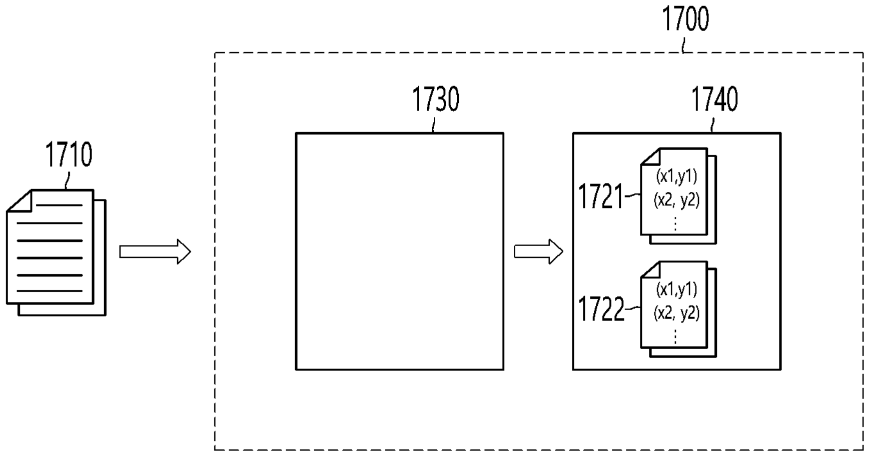
FIG. 17 is a conceptual diagram for describing a cuboid obtaining process of a cuboid obtaining device, according to the present disclosure.

FIG. 17 is a conceptual diagram for describing a cuboid obtaining process of a cuboid obtaining device, according to the present disclosure.

Referring to FIG. 17, it may be seen that a cuboid obtaining device 1700 according to the present disclosure includes a preprocessor 1730 and a model training unit 1740, and image data 1710 obtained while a vehicle is driving is input into the cuboid obtaining device 1700.

First, the image data 1710 is raw data of an image obtained by a camera installed in the autonomous vehicle while the vehicle is driving, and objects (e.g., people, two-wheeled vehicles, four-wheeled vehicles, other moving objects, etc.) included in the image may be recognized by the model training unit 1740. In the present disclosure, the method of recognizing an object in an image is not limited to a particular method, and thus, in addition to currently known methods, object recognition methods that will soon be developed may be used.

First outline data 1721 refers to information about an outline generated for each object recognized as an object in the image. In detail, information about the outline 1605A in FIG. 16A or the outline 1605B in FIG. 16B may be the first outline data 1721. In the present disclosure, a first outline surrounding an object may be a rectangular bounding box that perfectly fits the edge of the object considering protrusions of the object. The first outline data 1721 may also be generated in a process of training a learning model of the model training unit 1740, and in particular, coordinates of points forming the first outline may be used as reference information for finally determining coordinates of a cuboid.

Cuboid data 1722 refers to information about a cuboid obtained for each object recognized as an object in the image. For example, when a first object and a second object are included in the image, the cuboid data 1722 may include coordinates for a cuboid of the first object and coordinates for a cuboid of the second object. Here, the cuboids may each include side points, a rear sign, and an exposure sign, which are described above, and are obtained without considering the first outline data 1721, and thus, some cuboids are inaccurate.

In the present disclosure, when preprocessed image data is input into the learning model, objects are recognized in the image data, a certain number (e.g., 13) of values for each object are extracted as predicted values, then the first outline data 1721 is calculated by using some of the predicted values, the cuboid data 1722 is calculated in parallel by using the remaining predicted values, and the cuboid data 1722 is corrected to be dependent on the first outline data 1721. That is, the first outline data 1721 may function as a kind of boundary for converting the cuboid data 1722 into final cuboid coordinates.

When the first outline is a bounding box, the minimum number of pairs of coordinates for forming the first outline may be four. For example, the minimum coordinates of the first outline may be (x1, y1), (x1, y5), (x4, y1), and (x4, y5). As described above, when the coordinates of the first outline are determined, coordinate values for forming the first outline may be x1, y1, x5, and y5, and all coordinates that coincide with at least one of x-axis or y-axis coordinates of the coordinates of the first outline may be regarded as coordinates of the first outline. For example, (x3, y1) or (x1, y3) may be regarded as coordinates of the first outline. When the number of objects recognized in the image is n, the number of first outlines may also be n.

The preprocessor 1730 may preprocess the image data 1710. For example, the preprocessor 1730 may perform an embedding function such that the image data 1710 may be input into and learned by the learning model of the model training unit 1740 without an error, and may also perform a function of checking the integrity of the image data 1710. According to an embodiment, the preprocessor 1730 may be implemented to be integrated into the model training unit 1740.

The model training unit 1740 may receive the preprocessed image data 1710 from the preprocessor 1730 to perform training to obtain a cuboid of an object included in an image.

As illustrated in FIG. 17, the cuboid obtaining device 1700 according to the present disclosure does not directly obtain a cuboid of an object by using only the image data 1710, but may perform control such that information about a first outline generated for each object is reflected in the training, and thus, a finally obtained cuboid for each object includes accurate three-dimensional information of the object.

In particular, in response to obtaining coordinates of side points, an exposure sign, and a rear sign for the object after obtaining the coordinates of the first outline of the object, the learning model of the cuboid obtaining device 1700 may obtain cuboid coordinates of the object by correcting the coordinates of the obtained side points, exposure sign, and rear sign considering the coordinate values of the first outline.

For example, when coordinates of two points in the vertical direction forming side points are obtained, the cuboid obtaining device 1700 may correct the y-coordinate values of the coordinates of the two points in the vertical direction forming the side points, considering the coordinate values of the first outline. In more detail, the cuboid obtaining device 1700 may determine the direction of the recognized object, then obtain the coordinates of the two points in the vertical direction forming the side points, and then correct the y-coordinate values of the coordinates of the two points to match the height of the first outline.

The direction of the recognized object may be any one of a total of eight directions. For example, the direction of the recognized object may be any one of a front-left direction, a front direction, a front-right direction, a left-only direction, a right-only direction, a rear-left direction, a rear direction, and a rear-right direction. When the direction of the object recognized in the image is determined, the cuboid obtaining device 1700 performs control such that an accurate cuboid may be obtained by correcting the coordinates of the side points, the exposure sign, and the rear sign obtained as the cuboid of the object, according to a preset formula for each determined direction. The correction method applied differently for each of the eight directions of objects will be described below with reference to FIGS. 18 to 25.

Figure 18:
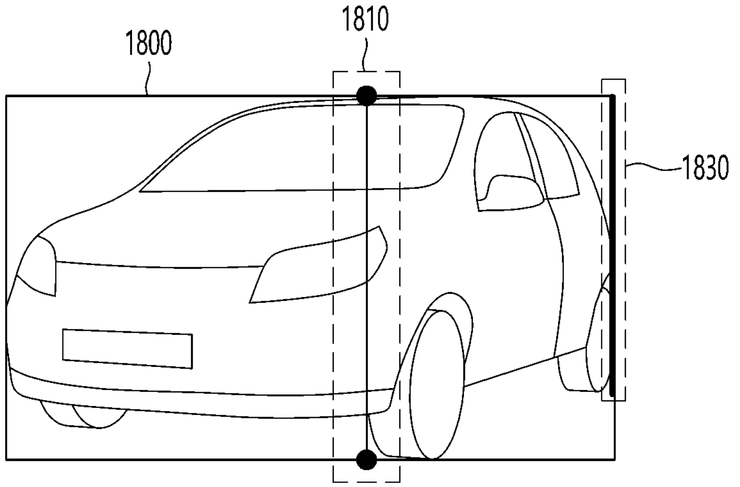
FIG. 18 is a diagram illustrating an example for describing a cuboid of an object in a front-left direction obtained by a cuboid obtaining device.

FIG. 18 is a diagram illustrating an example for describing a cuboid of an object in the front-left direction obtained by the cuboid obtaining device.

In FIG. 18, the object is a car in the front-left direction, the car is surrounded by a first outline 1800, and side points 1810 and a rear sign 1830 are schematically represented as a cuboid for the object.

The cuboid obtaining device may primarily analyze the object to detect that the object is in the front-left direction, and then secondarily obtain coordinates for the side points 1810 and the rear sign 1830 as a cuboid for the object. According to an embodiment, the cuboid obtaining device may primarily obtain the coordinates for the side points 1810 and the rear sign 1830 for the object and then secondarily detect the direction of the object.

After detecting that the direction of the object is the front-left direction, the cuboid obtaining device may correct y-coordinates of two points in the vertical direction constituting the side points 1810 to the closest y-coordinates of the first outline 1800. For example, when the first outline 1800 includes a side formed from (x1, y5) to (x10, y5), and the coordinates of the upper point of the side points 1810 are (x4, y4), the cuboid obtaining device may correct the coordinates of the upper point of the side points 1810 to (x4, y5). As another example, when the first outline 1800 includes a side formed from (x1, y5) to (x10, y5), and the coordinates of the upper point of the side points 1810 are (x4, y7), the cuboid obtaining device may correct the coordinates of the upper point of the side points 1810 to (x4, y5). That is, in the present disclosure, when the coordinates of a point before correction are outside or inside the first outline 1800, the coordinates of the point are corrected to the coordinates of a point forming the first outline 1800. Here, it would be understood by those of skill in the art that the y-coordinates of points between the coordinates (x1, y5) and (x10, y5) on the first outline 1800, for example, (x2, y5), (x3, y5), and (x4, y5), are maintained and only the x-coordinates of the points may be changed to values between x1 and x10.

In addition, as another example, after detecting that the direction of the object is the front-left direction, the cuboid obtaining device may perform a training process such that a line connecting the two points in the vertical direction constituting the rear sign 1830 is limited to lines that share at least part of the left or right side of the first outline 1800. In detail, the cuboid obtaining device may calculate the height of the rear of the object considering the first outline 1800, the overall outline of the recognized object, and the direction of the detected object (i.e., the front-left direction), and set the length of the rear sign 1830 to be equal to the calculated height. Here, because the rear of the object is not observed in the front-left direction, the rear sign 1830 may be expressed as a line sharing at least part of the left or right side of the first outline. Referring to FIG. 18, it may be seen that the cuboid obtaining device generates the rear sign 1830 to share the right side of the first outline 1800, considering the height of the rear of the recognized object and the starting point and the ending point of the rear such that the length of the rear sign 1830 is limited to part of the right side.

Figure 19:
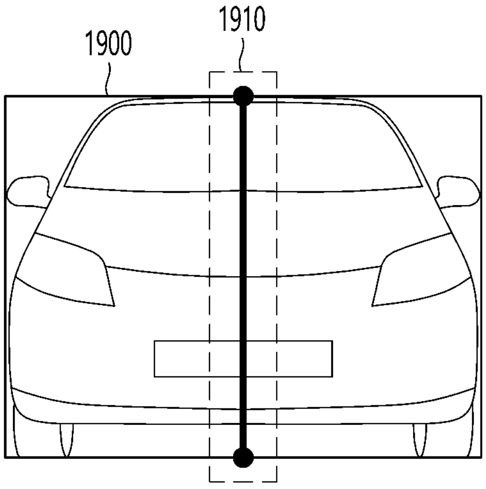
FIG. 19 is a diagram illustrating an example for describing a cuboid of an object in a front direction obtained by a cuboid obtaining device.

FIG. 19 is a diagram illustrating an example for describing a cuboid of an object in the front direction obtained by the cuboid obtaining device.

In FIG. 19, the object is a car in the front direction, the car is surrounded by a first outline 1900, and side points 1910 and a rear sign 1930 are schematically represented as a cuboid for the object.

The cuboid obtaining device may primarily analyze the object to detect that the object is in the front-only direction, and then secondarily obtain coordinates for the side points 1910 and the rear sign 1930 as a cuboid for the object. According to an embodiment, the cuboid obtaining device may primarily obtain the coordinates for the side points 1910 and the rear sign 1930 for the object and then secondarily detect the direction of the object.

After detecting that the direction of the object is the front direction, the cuboid obtaining device may set two points in the vertical direction constituting the side points 1910 as points located at the exact center between the upper and lower ends of the first outline 1900. Thereafter, a connection line of the side points 1910 may be automatically set.

In addition, after detecting that the direction of the object is the front direction, the cuboid obtaining device may obtain, as the rear sign 1930, a line that passes through the exact center of the recognized object and extends in the vertical direction. The rear sign 1930 is a sign indicating the rear of an object, and thus is not indicated when the object is in the front-only direction according to the above description, however, in the present disclosure, in a situation where the sides and rear of the object are not observed, the rear sign 1930 may be indicated as a line located in the exact center of the front of the object as illustrated in FIG. 19, and accordingly, the rear sign 1930 may indirectly provide three-dimensional information of the object.

Referring to FIG. 19, it may be seen that, when it is detected that the object is in the front-only direction, the connection line of the side points 1910 and the rear sign 1930 coincide with each other, and in this case, the lengths of the connection line of the side points 1910 and the rear sign 1930 is equal to the height of the first outline 1900.

Figure 20:
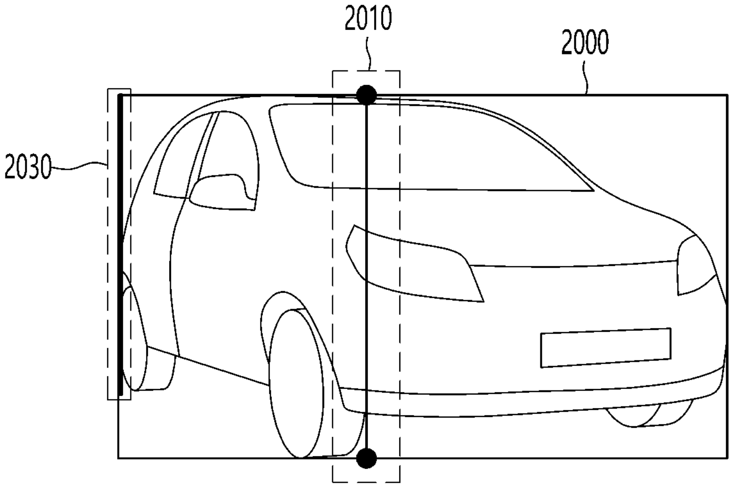
FIG. 20 is a diagram illustrating an example for describing a cuboid of an object in a front-right direction obtained by a cuboid obtaining device.

FIG. 20 is a diagram illustrating an example for describing a cuboid of an object in the front-right direction obtained by the cuboid obtaining device.

In FIG. 20, the object is a car in the front-right direction, the car is surrounded by a first outline 2000, and side points 2010 and a rear sign 2030 are schematically represented as a cuboid for the object.

The cuboid obtaining device may primarily analyze the object to detect that the object is in the front-right direction, and then secondarily obtain coordinates for the side points 2010 and the rear sign 2030 as a cuboid for the object. According to an embodiment, the cuboid obtaining device may primarily obtain the coordinates for the side points 2010 and the rear sign 2030 for the object and then secondarily detect the direction of the object.

After detecting that the direction of the object is the front-right direction, the cuboid obtaining device may correct y-coordinates of two points in the vertical direction constituting the side points 2010 to the closest y-coordinates of the first outline 2000. For example, when the first outline 2000 includes a side formed from (x1, y5) to (x10, y5), and the coordinates of the upper point of the side points 2010 are (x4, y4), the cuboid obtaining device may correct the coordinates of the upper point of the side points 2010 to (x4, y5). As another example, when the first outline 2000 includes a side formed from (x1, y5) to (x10, y5), and the coordinates of the upper point of the side points 2010 are (x4, y7), the cuboid obtaining device may correct the coordinates of the upper point of the side points 2010 to (x4, y5). That is, in the present disclosure, when the coordinates of a point before correction are outside or inside the first outline 2000, the coordinates of the point are corrected to the coordinates of a point forming the first outline 2000. Here, it would be understood by those of skill in the art that the y-coordinates of points between the coordinates (x1, y5) and (x10, y5) on the first outline 2000, for example, (x2, y5), (x3, y5), and (x4, y5), are maintained and only the x-coordinates of the points may be changed to values between x1 and x10.

In addition, as another example, after detecting that the direction of the object is the front-right direction, the cuboid obtaining device may perform a training process such that a line connecting the two points in the vertical direction constituting the rear sign 2030 is limited to lines that share at least part of the left or right side of the first outline 2000. In detail, the cuboid obtaining device may calculate the height of the rear of the object considering the first outline 2000, the overall outline of the recognized object, and the direction of the detected object (i.e., the front-right direction), and set the length of the rear sign 2030 to be equal to the calculated height. Here, because the rear of the object is not observed in the front-right direction, the rear sign 2030 may be expressed as a line sharing at least part of the left side of the first outline. Referring to FIG. 20, it may be seen that the cuboid obtaining device generates the rear sign 2030 to share the left side of the first outline 2000, considering the height of the rear of the recognized object and the starting point and the ending point of the rear such that the length of the rear sign 2030 is limited to part of the left side.

Figure 21:
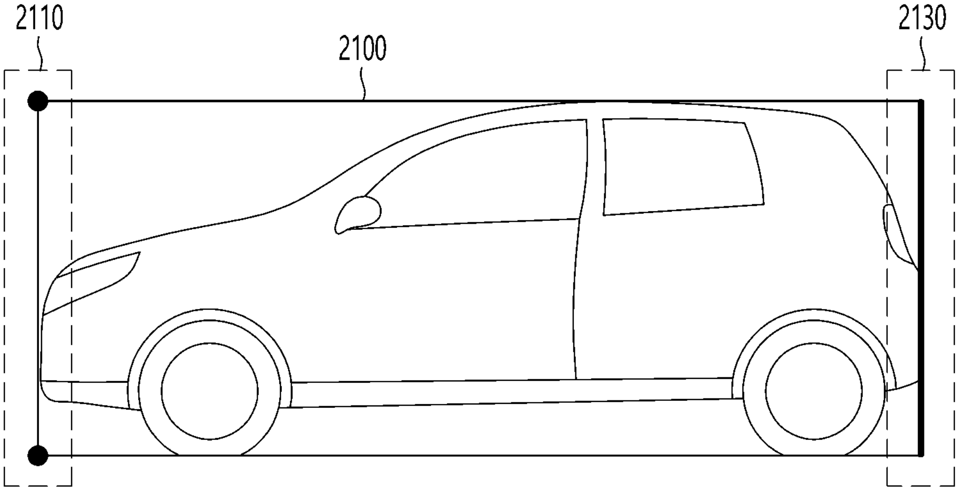
FIG. 21 is a diagram illustrating an example for describing a cuboid of an object whose left side is observed, which is obtained by a cuboid obtaining device.

FIG. 21 is a diagram illustrating an example for describing a cuboid of an object whose left side is observed, which is obtained by the cuboid obtaining device.

In FIG. 21, the object is a car whose only left side is observed in an image, the car is surrounded by a first outline 2100, and side points 2110 and a rear sign 2130 are schematically represented as a cuboid for the object.

The cuboid obtaining device may primarily analyze the object to detect that only the left side of the object is observed (left-only), and then secondarily obtain coordinates for the side points 2110 and the rear sign 2130 as a cuboid for the object. According to an embodiment, the cuboid obtaining device may primarily obtain the coordinates for the side points 2110 and the rear sign 2130 for the object and then secondarily detect the direction of the object.

After detecting that only the left side of the object is observed in the image, the cuboid obtaining device may correct y-coordinates of two points in the vertical direction constituting the side points 2110 to the closest y-coordinates of the first outline 2100. For example, when the first outline 2100 includes a side formed from (x1, y5) to (x10, y5), and the coordinates of the upper point of the side points 2110 are (x4, y4), the cuboid obtaining device may correct the coordinates of the upper point of the side points 2110 to (x4, y5). As another example, when the first outline 2100 includes a side formed from (x1, y5) to (x10, y5), and the coordinates of the upper point of the side points 2110 are (x4, y7), the cuboid obtaining device may correct the coordinates of the upper point of the side points 2110 to (x4, y5). That is, in the present disclosure, when the coordinates of a point before correction are outside or inside the first outline 2100, the coordinates of the point are corrected to the coordinates of a point forming the first outline 2100.

In addition, as another example, when only the left side of the object is observed, the cuboid obtaining device may perform a training process such that a line connecting the two points in the vertical direction constituting the rear sign 2130 is limited to lines that share the left or right side of the first outline 2100. In detail, the cuboid obtaining device may calculate the height of the rear of the object considering the first outline 2100, the overall outline of the recognized object, and the observed direction of the object (i.e., the left side), and set the length of the rear sign 2130 to be equal to the calculated height. Here, because the rear of the object is not observed in the left side direction, the rear sign 2130 may be expressed as a line sharing at least part of the left or right side of the first outline. Referring to FIG. 21, it may be seen that the cuboid obtaining device generates the rear sign 2130 to share the right side of the first outline 2100.

Figure 22:
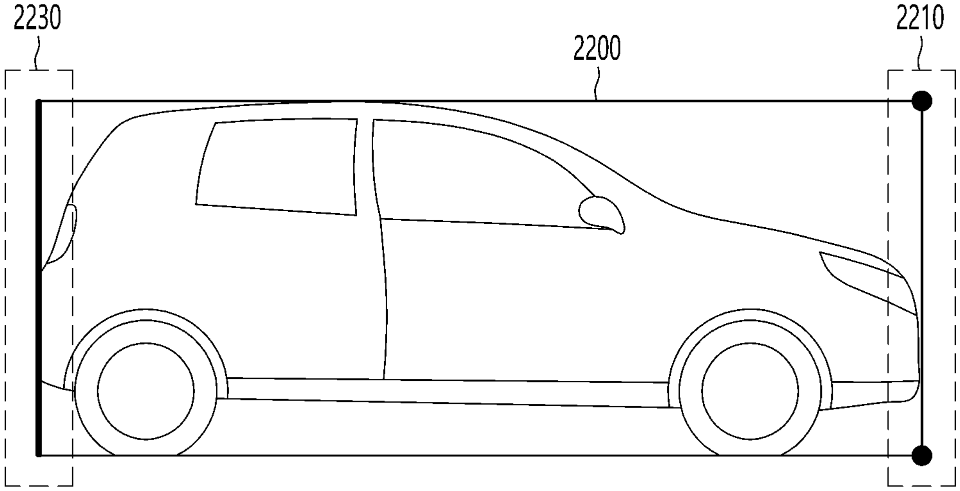
FIG. 22 is a diagram illustrating an example for describing a cuboid of an object whose right side is observed, which is obtained by a cuboid obtaining device.

FIG. 22 is a diagram illustrating an example for describing a cuboid of an object whose right side is observed, which is obtained by the cuboid obtaining device.

In FIG. 22, the object is a car whose only right side is observed in an image, the car is surrounded by a first outline 2200, and side points 2210 and a rear sign 2230 are schematically represented as a cuboid for the object.

The cuboid obtaining device may primarily analyze the object to detect that only the right side of the object is observed (right-only), and then secondarily obtain coordinates for the side points 2210 and the rear sign 2230 as a cuboid for the object. According to an embodiment, the cuboid obtaining device may primarily obtain the coordinates for the side points 2210 and the rear sign 2230 for the object and then secondarily detect the direction of the object.

After detecting that only the right side of the object is observed in the image, the cuboid obtaining device may correct y-coordinates of two points in the vertical direction constituting the side points 2210 to the closest y-coordinates of the first outline 2200. For example, when the first outline 2200 includes a side formed from (x1, y5) to (x10, y5), and the coordinates of the upper point of the side points 2210 are (x4, y4), the cuboid obtaining device may correct the coordinates of the upper point of the side points 2210 to (x4, y5). As another example, when the first outline 2200 includes a side formed from (x1, y5) to (x10, y5), and the coordinates of the upper point of the side points 2210 are (x4, y7), the cuboid obtaining device may correct the coordinates of the upper point of the side points 2210 to (x4, y5). That is, in the present disclosure, when the coordinates of a point before correction are outside or inside the first outline 2200, the coordinates of the point are corrected to the coordinates of a point forming the first outline 2200.

In addition, as another example, when only the right side of the object is observed, the cuboid obtaining device may perform a training process such that a line connecting the two points in the vertical direction constituting the rear sign 2230 is limited to lines that share the left or right side of the first outline 2200. In detail, the cuboid obtaining device may calculate the height of the rear of the object considering the first outline 2200, the overall outline of the recognized object, and the observed direction of the object (i.e., the right side), and set the length of the rear sign 2230 to be equal to the calculated height. Here, because the rear of the object is not observed in the right side direction, the rear sign 2230 may be expressed as a line sharing at least part of the left or right side of the first outline. Referring to FIG. 22, it may be seen that the cuboid obtaining device generates the rear sign 2230 to share the left side of the first outline 2200.

Figure 23:
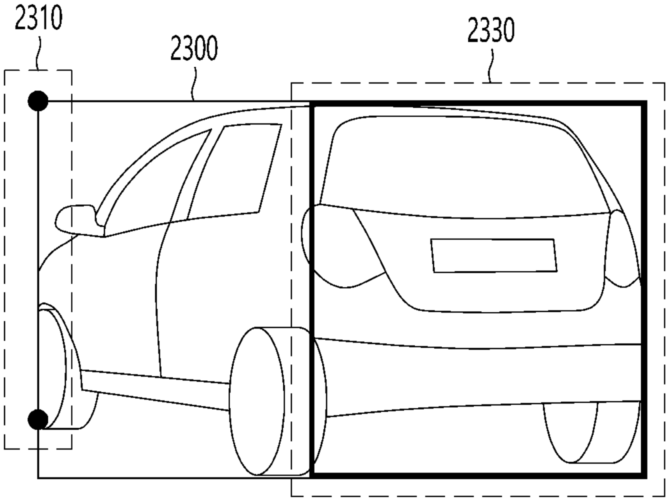
FIG. 23 is a diagram illustrating an example for describing a cuboid of an object in a rear-left direction obtained by a cuboid obtaining device.

FIG. 23 is a diagram illustrating an example for describing a cuboid of an object in the rear-left direction obtained by the cuboid obtaining device.

In FIG. 23, the object is a car in the rear-left direction, the car is surrounded by a first outline 2300, and side points 2310 and a rear sign 2330 are schematically represented as a cuboid for the object.

The cuboid obtaining device may primarily analyze the object to detect that the object is in the rear-left direction, and then secondarily obtain coordinates for the side points 2310 and the rear sign 2330 as a cuboid for the object. According to an embodiment, the cuboid obtaining device may primarily obtain the coordinates for the side points 2310 and the rear sign 2330 for the object and then secondarily detect the direction of the object.

After detecting that the direction of the object is the rear-left direction, the cuboid obtaining device may correct y-coordinates of two points in the vertical direction constituting the side points 2310 to the closest y-coordinates of the first outline 2300. For example, when the first outline 2300 includes a side formed from (x1, y5) to (x10, y5), and the coordinates of the upper point of the side points 2310 are (x4, y4), the cuboid obtaining device may correct the coordinates of the upper point of the side points 2310 to (x4, y5). As another example, when the first outline 2300 includes a side formed from (x1, y5) to (x10, y5), and the coordinates of the upper point of the side points 2310 are (x4, y7), the cuboid obtaining device may correct the coordinates of the upper point of the side points 2310 to (x4, y5).

Meanwhile, the cuboid obtaining device may determine coordinates of the lower point of the side points 2310 by using the direction of the object and the length between the starting and ending points that determine the height of the front of the object. That the direction of the recognized object is the rear-left direction means that the front of the object is not observed, and thus, the x-coordinates of the side points 2310 coincide with the x-coordinates of the left side of the first outline. In addition, that the direction of the object is the rear-left direction means that the object is moving in a direction away from the observer, and thus, the starting point that determines the height of the front of the object has the y-coordinate of the uppermost point of the first outline, and the ending point that determines the height of the front of the object has the y-coordinate of a point where the left front tire of the object is in contact with the ground surface. Accordingly, as illustrated in FIG. 23, the length of the line connecting the side points 2310 vertically arranged on the first outline 2300 may be limited to the length of part of the left side of the first outline 2300.

In addition, as another example, after detecting that the direction of the object is the rear-left direction, the cuboid obtaining device may perform a training process such that the rear sign 2330 is limited to quadrangles sharing the right side of the first outline 2300. Referring to FIG. 23, it may be seen that the rear sign 2330 is indicated in a quadrangular shape that shares the right side of the first outline 2300 and also shares part of the upper and lower sides of the first outline 2300. In FIG. 23, the width of the rear sign 2330 means the width of the rear of the object, and the height of the rear sign 2330 means the height of the rear of the object.

Figure 24:
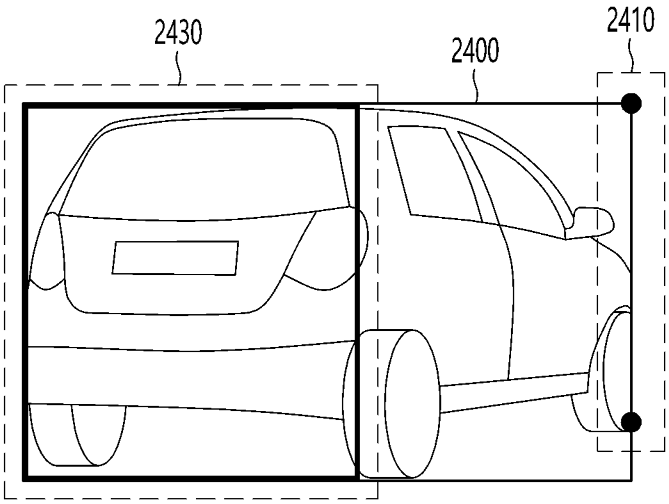
FIG. 24 is a diagram illustrating an example for describing a cuboid of an object in a rear-right direction obtained by a cuboid obtaining device.

FIG. 24 is a diagram illustrating an example for describing a cuboid of an object in the rear-right direction obtained by the cuboid obtaining device.

In FIG. 23, the object is a car in the rear-right direction, the car is surrounded by a first outline 2400, and side points 2410 and a rear sign 2430 are schematically represented as a cuboid for the object.

The cuboid obtaining device may primarily analyze the object to detect that the object is in the rear-right direction, and then secondarily obtain coordinates for the side points 2410 and the rear sign 2430 as a cuboid for the object. According to an embodiment, the cuboid obtaining device may primarily obtain the coordinates for the side points 2410 and the rear sign 2430 for the object and then secondarily detect the direction of the object.

After detecting that the direction of the object is the rear-right direction, the cuboid obtaining device may correct y-coordinates of two points in the vertical direction constituting the side points 2410 to the closest y-coordinates of the first outline 2400. For example, when the first outline 2400 includes a side formed from (x1, y5) to (x10, y5), and the coordinates of the upper point of the side points 2410 are (x4, y4), the cuboid obtaining device may correct the coordinates of the upper point of the side points 2410 to (x4, y5). As another example, when the first outline 2400 includes a side formed from (x1, y5) to (x10, y5), and the coordinates of the upper point of the side points 2410 are (x4, y7), the cuboid obtaining device may correct the coordinates of the upper point of the side points 2410 to (x4, y5).

Meanwhile, the cuboid obtaining device may determine coordinates of the lower point of the side points 2410 by using the direction of the object and the length between the starting and ending points that determine the height of the front of the object. That the direction of the recognized object is the rear-right direction means that the front of the object is not observed, and thus, the x-coordinates of the side points 2410 coincide with the x-coordinates of the right side of the first outline 2400. In addition, that the direction of the object is the rear-right direction means that the object is moving in a direction away from the observer, and thus, the starting point that determines the height of the front of the object has the y-coordinate of the uppermost point of the first outline 2400, and the ending point that determines the height of the front of the object has the y-coordinate of a point where the right front tire of the object is in contact with the ground surface. Accordingly, as illustrated in FIG. 24, the length of the line connecting the side points 2410 vertically arranged on the first outline 2400 may be limited to the length of part of the right side of the first outline 2400.

In addition, as another example, after detecting that the direction of the object is the rear-right direction, the cuboid obtaining device may perform a training process such that the rear sign 2430 is limited to quadrangles sharing the left side of the first outline 2400. Referring to FIG. 24, it may be seen that the rear sign 2430 is indicated in a quadrangular shape that shares the left side of the first outline 2400 and also shares part of the upper and lower sides of the first outline 2400. In FIG. 24, the width of the rear sign 2430 means the width of the rear of the object, and the height of the rear sign 2430 means the height of the rear of the object.

Figure 25:
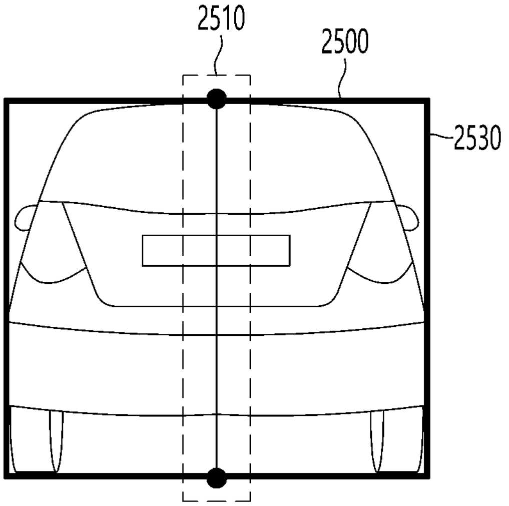
FIG. 25 is a diagram illustrating an example for describing a cuboid of an object in a rear direction obtained by a cuboid obtaining device.

FIG. 25 is a diagram illustrating an example for describing a cuboid of an object in the rear direction obtained by the cuboid obtaining device.

In FIG. 25, the object is a car in the rear direction, the car is surrounded by a first outline 2500, and side points 2510 and a rear sign 2530 are schematically represented as a cuboid for the object.

When the direction of the object recognized in the image is the rear-only direction, the cuboid obtaining device may generate the side points 2510 as a line connecting two points respectively arranged at the uppermost and lowermost points of the vertical line passing through the exact center of the object, as described above with reference to FIG. 19.

In addition, when the direction of the recognized object is the rear-only direction, as illustrated in FIG. 25, the cuboid obtaining device may make the rear sign 2530 coincide with the first outline 2500.

As described above with reference to FIGS. 18 to 25, the cuboid obtaining device according to the present disclosure may train the learning model to generate a cuboid including side points and a rear sign. Although the side points and the rear sign obtained in this process have very simple shapes, they may each indicate the direction, position, and three-dimensional information of the object, and thus, when implementing an autonomous driving algorithm, high efficiency and accuracy in recognizing and determining a moving object may be guaranteed. In addition, the cuboid obtaining device according to the present disclosure may train the learning model such that x-coordinates and y-coordinates of the side points and the rear sign are dependent on a first outline, and thus, accurate cuboid information may be generated.

Figure 26A:
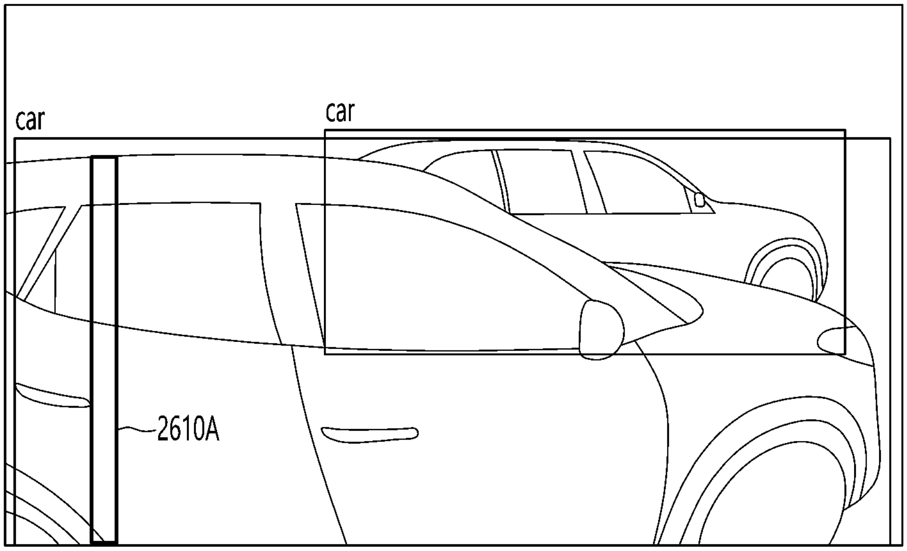
FIGS. 26A and 26B are diagrams schematically illustrating an example of a process in which a rear sign is corrected by a cuboid obtaining device, according to the present disclosure.
Figure 26B:
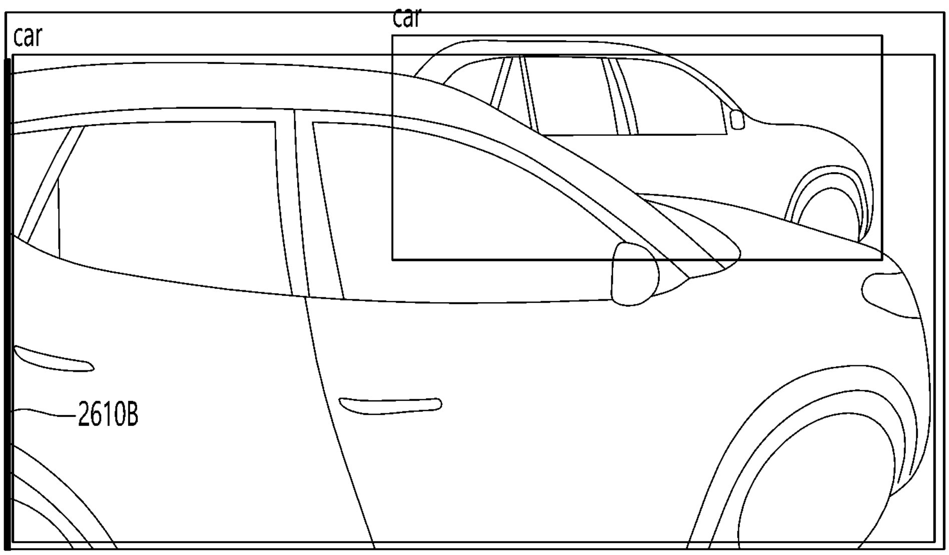

FIGS. 26A and 26B are diagrams schematically illustrating an example of a process in which a rear sign is corrected by the cuboid obtaining device, according to the present disclosure.

Referring to FIG. 26A, it may be seen that a rear sign 2610A is expressed inside a first outline of a passenger car ('car'). The passenger car in FIG. 26A is an object whose only right side is observed, and because the rear of the passenger car cannot be observed, the rear sign needs to be a line that shares the entire left side of the first outline as in FIG. 26B, rather than a square inside the first outline as in FIG. 26A. The cuboid obtaining device according to the present disclosure may obtain a cuboid 2610B for the passenger car such that a result as illustrated in FIG. 26B is output, rather than a result as illustrated in FIG. 26A.

Figure 27A:
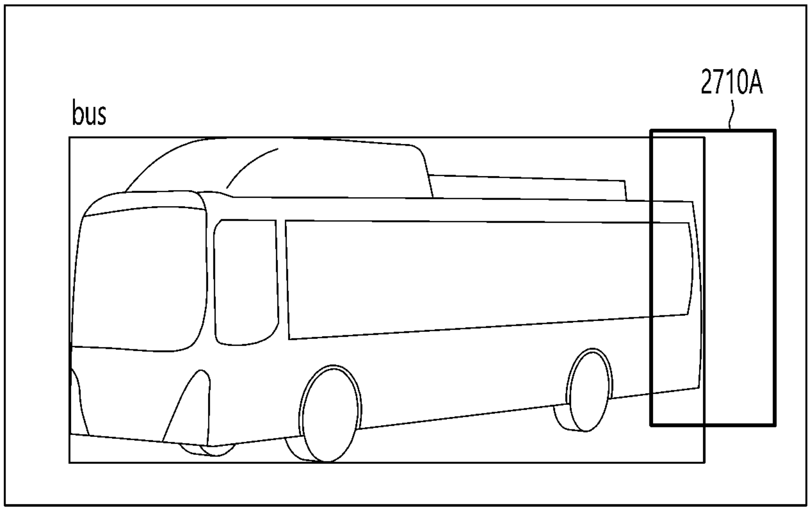
FIGS. 27A and 27B are diagrams schematically illustrating another example of a process in which a rear sign is corrected by a cuboid obtaining device, according to the present disclosure.
Figure 27B:
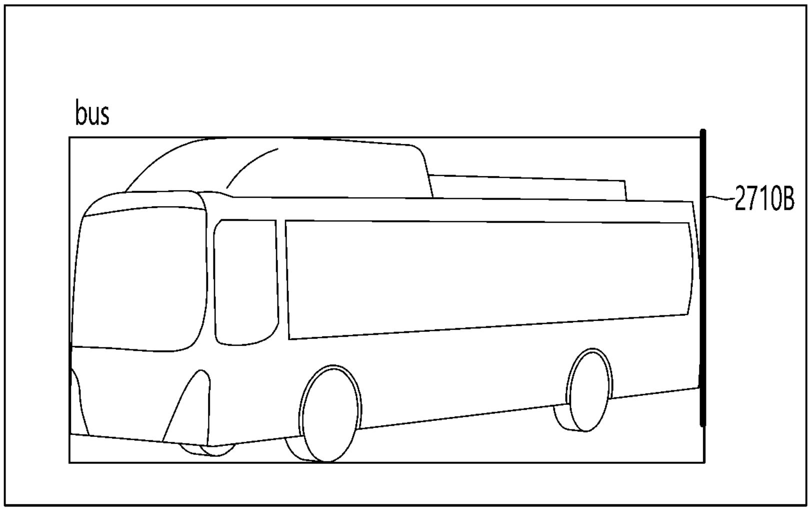

FIGS. 27A and 27B are diagrams schematically illustrating an example of a process in which a rear sign is corrected by the cuboid obtaining device, according to the present disclosure.

Referring to FIG. 27A, it may be seen that a rear sign 2710A that deviates from a first outline of a bus ('bus') is indicated in a rear portion of the bus. The bus in FIG. 27A is an object in the front-left direction, and because the rear of the bus cannot be observed, the rear sign needs to be a line 2710B that shares part of the right side of the first outline as in FIG. 27B, rather than a square that deviates from the first outline as in FIG. 27A. The cuboid obtaining device according to the present disclosure may obtain a cuboid for the bus such that a result as illustrated in FIG. 27B is output, rather than a result as illustrated in FIG. 27A.

Figure 28A:
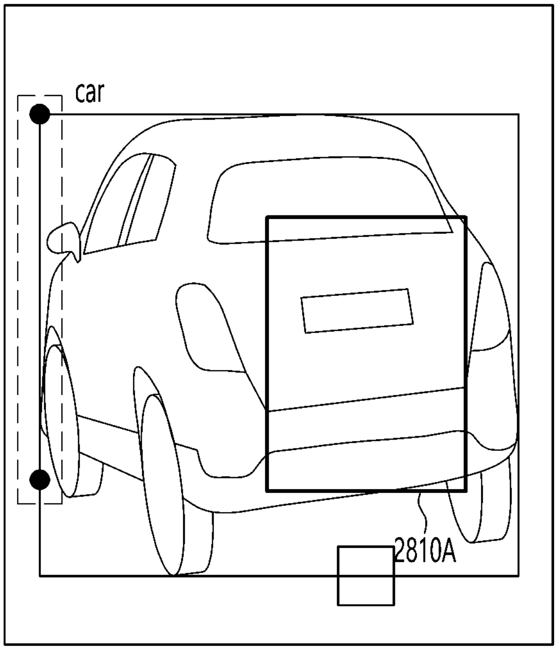
FIGS. 28A and 28B are diagrams schematically illustrating another example of a process in which a rear sign is corrected by a cuboid obtaining device, according to the present disclosure.
Figure 28B:
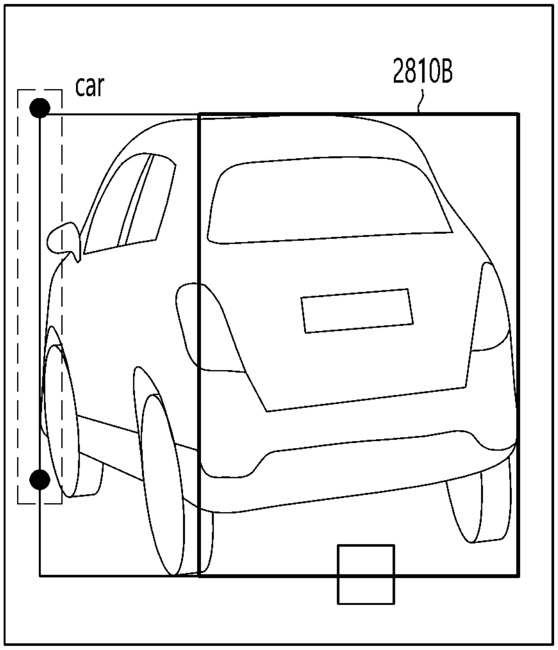

FIGS. 28A and 28B are diagrams schematically illustrating another example of a process in which a rear sign is corrected by the cuboid obtaining device, according to the present disclosure.

Referring to FIG. 28A, it may be seen that a rear sign 2810A surrounding part of the rear of a passenger car ('car') is indicated in a rear portion of the passenger car. The passenger car in FIG. 28A is an object in the rear-left direction, and because the entire rear of the passenger car may be observed, the rear sign needs to be a quadrangle 2810B that shares the right side of the first outline as illustrated in FIG. 28B. The cuboid obtaining device according to the present disclosure may obtain a cuboid for the passenger car in the rear-left direction such that a result as illustrated in FIG. 28B is output, rather than a result as illustrated in FIG. 28A.

Figure 29:
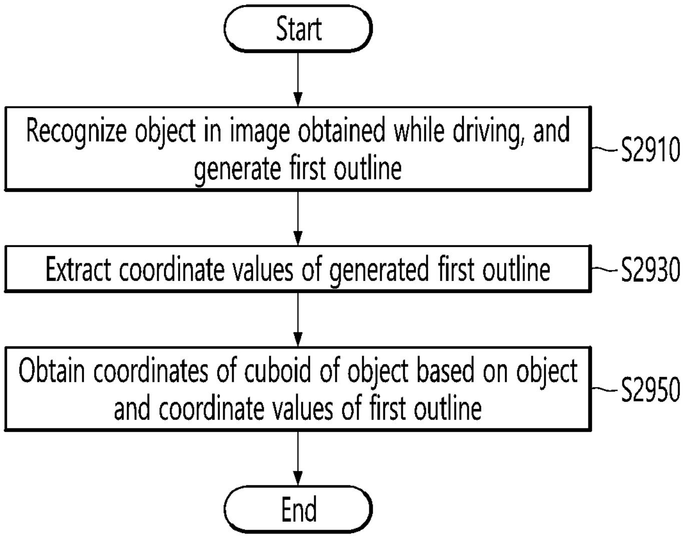
FIG. 29 is a flowchart of an example of a cuboid obtaining method according to the present disclosure.

FIG. 29 is a flowchart of an example of a cuboid obtaining method according to the present disclosure.

The method of FIG. 29 may be implemented by the cuboid obtaining device 1700 described above with reference to FIG. 17, and thus, the descriptions provided above with reference to FIG. 17 will be omitted.

The cuboid obtaining device 1700 may recognize at least one object included in a first image obtained while driving, and generate a first outline for each recognized object (S2910).

The cuboid obtaining device 1700 may extract first coordinate values constituting the generated first outline from the first image (S2930).

The cuboid obtaining device 1700 may obtain coordinates of a cuboid of the recognized object based on the recognized object and the extracted first coordinate values (S2950).

Figure 30:
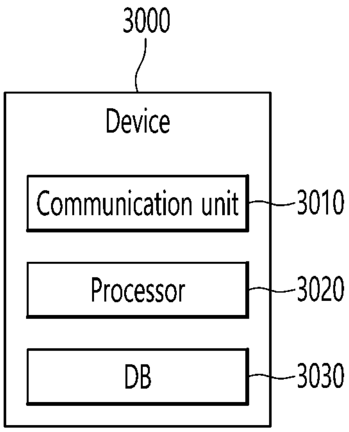
FIG. 30 is a block diagram of a cuboid obtaining device according to an embodiment.

FIG. 30 is a block diagram of a cuboid obtaining device according to an embodiment.

Referring to FIG. 30, a cuboid obtaining device 3000 may include a communication unit 3010, a processor 3020, and a DB 3030. FIG. 30 illustrates the cuboid obtaining device 3000 including only the components related to an embodiment. Therefore, it would be understood by those of skill in the art that other general-purpose components may be further included in addition to those illustrated in FIG. 30.

The communication unit 3010 may include one or more components for performing wired/wireless communication with an external server or an external device. For example, the communication unit 3010 may include at least one of a short-range communication unit (not shown), a mobile communication unit (not shown), and a broadcast receiver (not shown).

The DB 3030 is hardware for storing various pieces of data processed by the cuboid obtaining device 3000, and may store a program for the processor 3020 to perform processing and control.

The DB 3030 may include RAM such as DRAM or SRAM, ROM, EEPROM, a CD-ROM, a Blu-ray or other optical disk storage, an HDD, an SSD, or flash memory.

The processor 3020 controls the overall operation of the cuboid obtaining device 3000. For example, the processor 3020 may execute programs stored in the DB 3030 to control the overall operation of an input unit (not shown), a display (not shown), the communication unit 3010, the DB 3030, and the like. The processor 3020 may execute programs stored in the DB 3030 to control the operation of the cuboid obtaining device 3000.

The processor 3020 may control at least some of the operations of the cuboid obtaining device described above with reference to FIGS. 16 to 29.

For example, the processor 3020 may recognize at least one object included in a first image obtained while driving, generate a first outline for each recognized object, extract first coordinate values constituting the generated first outline from the first image, and obtain coordinates of a cuboid of the recognized object based on the recognized object and the extracted first coordinate values.

The processor 3020 may be implemented by using at least one of ASICs, DSPs, DSPDs, PLDs, FPGAs, controllers, microcontrollers, microprocessors, and other electrical units for performing functions.

Figure 31:
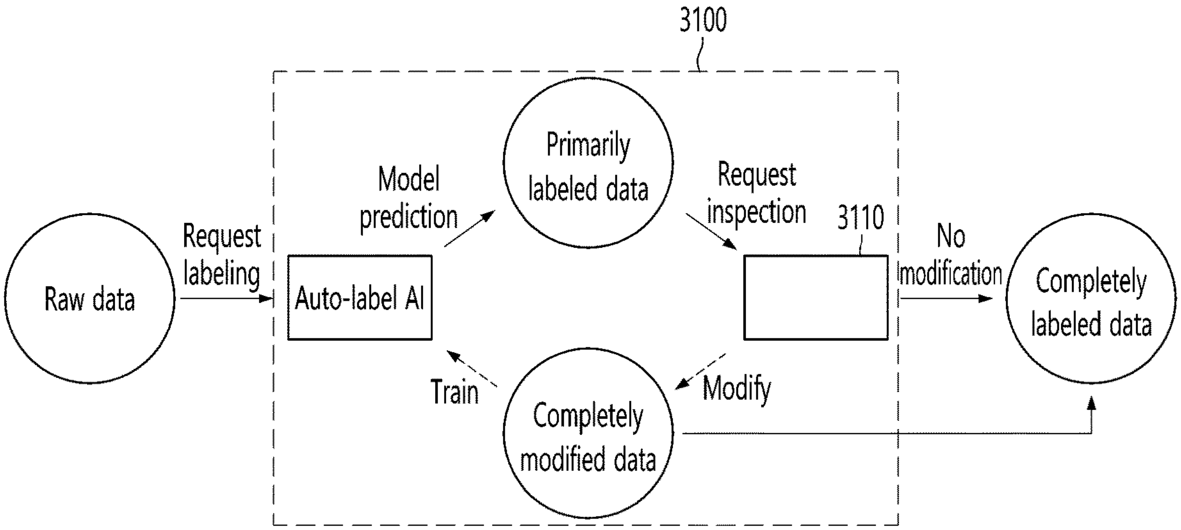
FIG. 31 is a diagram conceptually illustrating an operation process of a device for correcting a visual sign of an object in an image, according to the present disclosure.

FIG. 31 is a diagram conceptually illustrating an operation process of a device for correcting a visual sign of an object in an image, according to the present disclosure.

In more detail, FIG. 31 is a diagram for conceptually describing a process in which original data is input into a device 3100 for correcting a visual sign of an object in an image, to be finally processed into completely labeled data. For the sake of brevity, hereinafter, the device for correcting a visual sign of an object in an image according to the present disclosure will be referred to as simply a 'visual sign correction device'.

In general, a camera installed in an autonomous vehicle is able to photograph a scene observed while the autonomous vehicle is driving, and the image captured by the camera may be raw data illustrated in FIG. 31. The raw data may be a video including a plurality of frames, and each frame constituting the video may contain a plurality of objects. The raw data may be input into an AI-based learning model, such as a deep learning model, and then labeled. Through an auto-labeling process performed by the learning model, objects in an image may be recognized and characteristic information of the recognized objects may be obtained, however, a labeling result is not perfect, and thus, primarily labeled data may be inspected by an inspector 3110. Data that has been modified through the inspection process may become training data for the learning model and classified as completely labeled data, and data determined by the inspector 3110 in the inspection process as not requiring modification may not become training data for the learning model, and may be immediately classified as completely labeled data.

The present disclosure suggests a method for improving the speed and accuracy of labeling objects included in an image obtained while driving, by implementing the inspector 3110, who inspects primarily labeled data, as an automated device rather than a human. The visual sign correction device 3100 according to the present disclosure may receive raw data, primarily perform auto-labeling, and perform inspection on a result of the auto-labeling, so as to repeatedly perform a process of correcting (modifying) part that is not completely labeled, and classifying, as labeled data, data on which labeling has been completely performed, thereby improving an AI model that is physically or logically included therein.

As described above with reference to FIGS. 18 to 25, the visual sign correction device according to the present disclosure may train a learning model to generate a cuboid including side points and a rear sign. Although the side points and the rear sign obtained in this process have very simple shapes, they may each indicate the direction, position, and three-dimensional information of the object, and thus, when implementing an autonomous driving algorithm, high efficiency and accuracy in recognizing and determining a moving object may be guaranteed. In addition, the visual sign correction device according to the present disclosure may train the learning model such that x-coordinates and y-coordinates of the side points and the rear sign are dependent on an outline, and thus, accurate cuboid information may be generated.

Figure 32A:
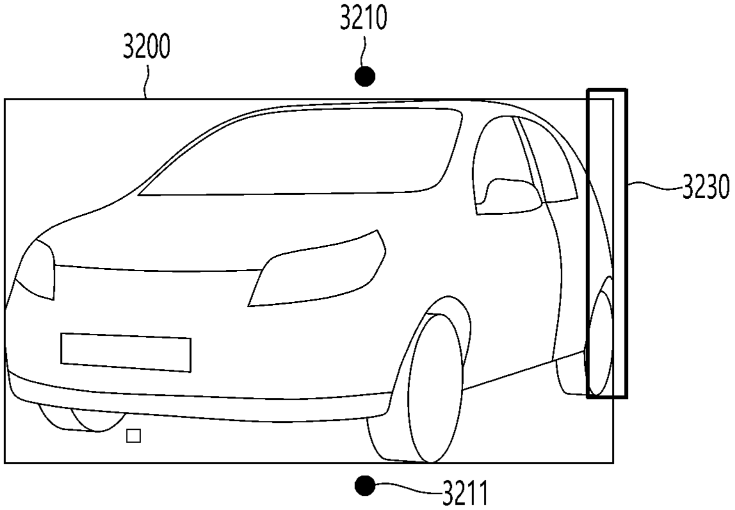
FIGS. 32A and 32B are diagrams schematically illustrating an example of a first correction process performed by a visual sign correction device according to the present disclosure.
Figure 32B:
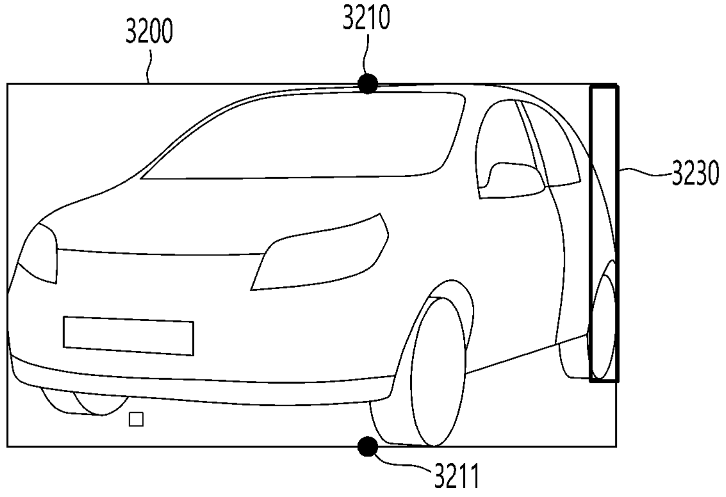

FIGS. 32A and 32B are diagrams schematically illustrating an example of a first correction process performed by the visual sign correction device according to the present disclosure.

FIG. 32A schematically illustrates that side points 3210 and 3211 and a rear sign 3230 are generated as a cuboid for an object by inputting an image including the object into a learning model. The upper point 3210 and the lower point 3211 of the side points 3210 and 3211 in FIG. 32A are both located outside an outline 3200 of the object. In addition, the rear sign 3230 in FIG. 32A has a rectangular shape whose length is longer than the width, and coordinates of some points constituting the rear sign 3230 are located outside the outline 3200.

When primarily labeled data is generated as illustrated in FIG. 32A, the visual sign correction device according to the present disclosure may detect that the upper point 3210 and the lower point 3211 of the side points 3210 and 3211 are located outside the outline 3200, and perform first correction such that the upper point 3210 and the lower point 3211 of the side points 3210 and 3211 are moved toward the closest points on the outline, respectively. Although not illustrated in FIG. 32A, the first correction may be equally applied even when only one of the upper point and the lower point constituting the side points is located outside the outline 3200.

In addition, the visual sign correction device may detect the shape of the quadrangular rear sign 3230, remove part of the rear sign 3230 located outside the outline 3200, and then perform correction such that portions of the upper side and the right side of the outline 3200 constitute the rear sign 3230.

Referring to FIG. 32B, it may be seen that the upper point 3210 and the lower point 3211 of the side points 3210 and 3211 that were located outside the outline 3200 in FIG. 32A are both moved to points constituting the outline 3200, and the area of the quadrangular rear sign 3230 is reduced as the part outside the outline 3200 is removed.

In FIG. 32A, the rear sign 3230 has been corrected in such a way that only the part located outside the outline 3200 is removed, however, according to an embodiment, in order to remove the part of the rear sign 3230 located outside the outline 3200, the visual sign correction device may move the rear sign 3230 to the inside of the outline 3200 while maintaining the area of the rear sign 3230.

Figure 33A:
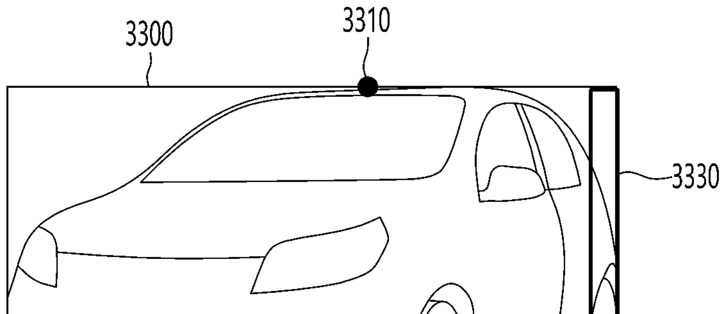
FIGS. 33A and 33B are diagrams schematically illustrating an example of a second correction process performed by a visual sign correction device according to the present disclosure.
Figure 33B:
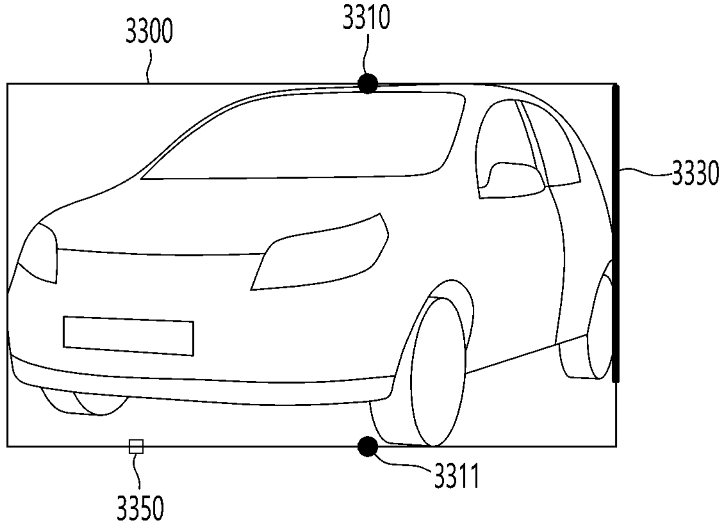

FIGS. 33A and 33B are diagrams schematically illustrating an example of a second correction process performed by the visual sign correction device according to the present disclosure.

FIG. 33A is the same as FIG. 32B for convenience of description. In FIG. 33A, an upper point 3310 and a lower point 3311 of side points 3310 and 3311 have been moved to the inside of an outline 3300.

The visual sign correction device according to the present disclosure may detect the direction an object in a state where the first correction is applied as illustrated in FIG. 33A, and then change a rear sign 3330 in FIG. 33A to the rear sign 3330 in FIG. 33B, based on the detected direction and the height of the rear of the object. In detail, when the direction of the object is detected as the front-left direction, in order to schematically indicate that the rear of the object is not observed, the visual sign correction device may perform second correction to change the quadrangular rear sign 3330 in FIG. 33A into the linear rear sign 3330 in FIG. 33B.

In the above second correction process, the visual sign correction device may also move the position of an exposure sign 3350 to a point forming the outline 3300. The exposure sign 3350 may indicate whether the entire object is captured (exposed) in the image without omitting any part thereof, and because the entire object is surrounded by the outline 3300 in FIG. 33B, the visual sign correction device may change the y-coordinate of the exposure sign 3350 to move it to the position of a point forming the lower side of the outline 3300.

Figure 34A:
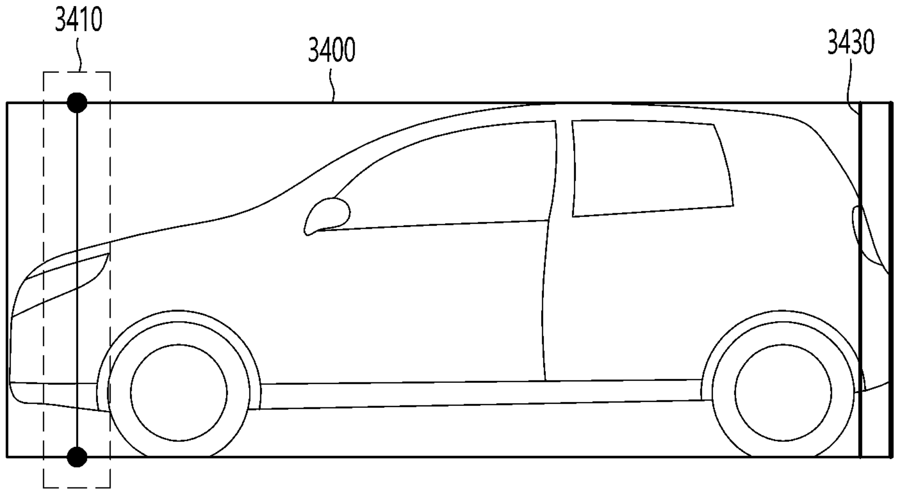
FIGS. 34A and 34B are diagrams schematically illustrating another example of a second correction process performed by a visual sign correction device according to the present disclosure.
Figure 34B:
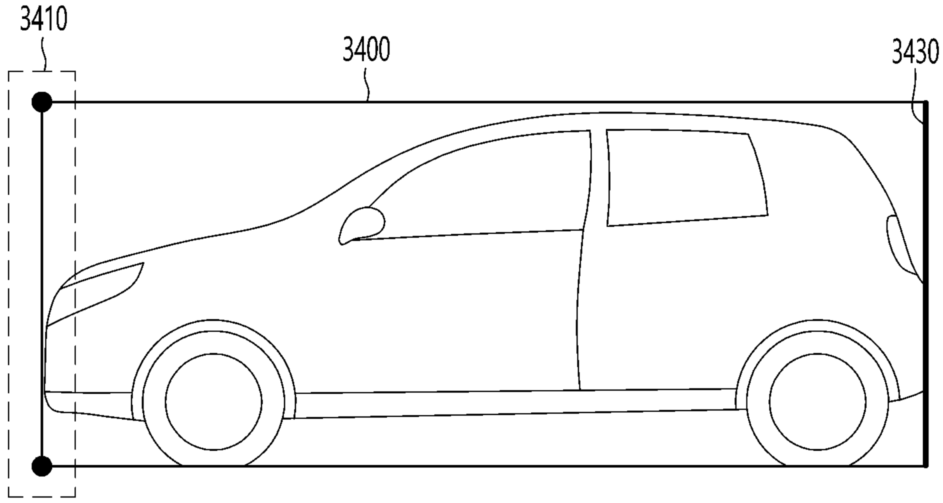

FIGS. 34A and 34B are diagrams schematically illustrating another example of a second correction process performed by the visual sign correction device according to the present disclosure.

The visual sign correction device according to the present disclosure may detect the direction an object in a state where the first correction is applied as illustrated in FIG. 34A, and then correct side points 3410 and a rear sign 3430 in FIG. 34A to the side points 3410 and the rear sign 3430 in FIG. 34B, respectively, based on the detected direction and the height of the rear of the object.

In detail, when the direction of the object is detected as the left-only direction, in order to schematically indicate that both the front and rear of the object are not observed, the visual sign correction device may perform second correction to change the positions of the side points 3410 in FIG. 34A to the positions of the side points 3410 in FIG. 34B, and change the quadrangular rear sign 3430 in FIG. 34A to the linear rear sign 3430 in FIG. 34B. When the second correction is completed, the side points 3410 coincide with the left side of an outline 3400, and the rear sign 3430 coincides with the right side of the outline 3400.

Figure 35A:
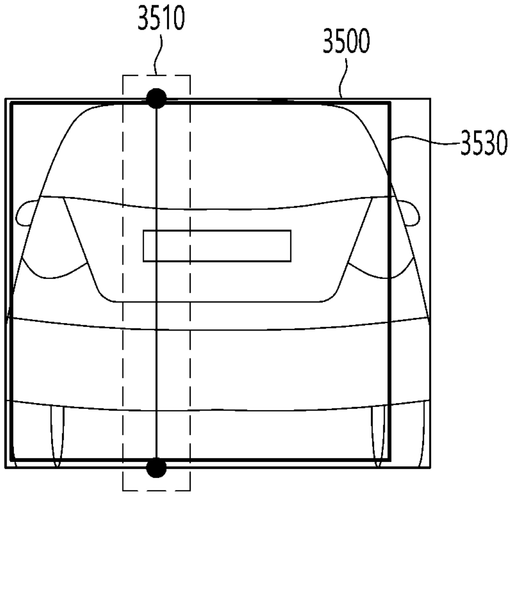
FIGS. 35A and 35B are diagrams schematically illustrating another example of a second correction process performed by a visual sign correction device according to the present disclosure.
Figure 35B:
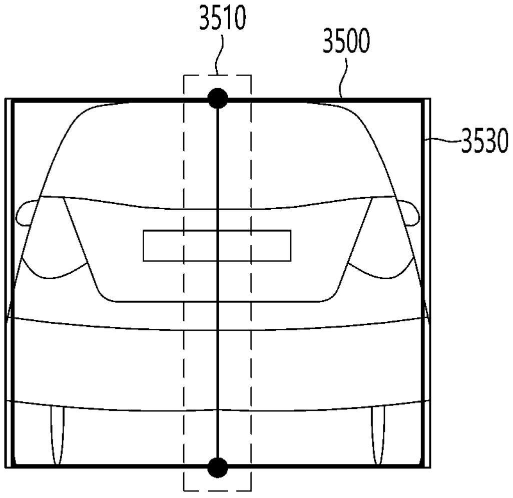

FIGS. 35A and 35B are diagrams schematically illustrating another example of a second correction process performed by the visual sign correction device according to the present disclosure.

The visual sign correction device according to the present disclosure may detect the direction an object in a state where the first correction is applied as illustrated in FIG. 35A, and then correct side points 3510 and a rear sign 3530 in FIG. 35A to the side points 3510 and the rear sign 3530 in FIG. 35B, respectively, based on the detected direction and the height of the rear of the object.

In detail, when the direction of the object is detected as the rear-only direction, in order to schematically indicate that the front and sides of the object are all not observed, the visual sign correction device may perform second correction to change the positions of the side points 3510 in FIG. 35A to the positions of the side points 3510 in FIG. 35B, and change the quadrangular rear sign 3530 in FIG. 35A to the linear rear sign 3530 in FIG. 35B. When the second correction is completed, the side points 3510 are indicated as two points and a connecting line dividing the exact center of the upper and lower sides of an outline 3500, and the rear sign 3530 coincides with the outline 3500.

Figure 36:
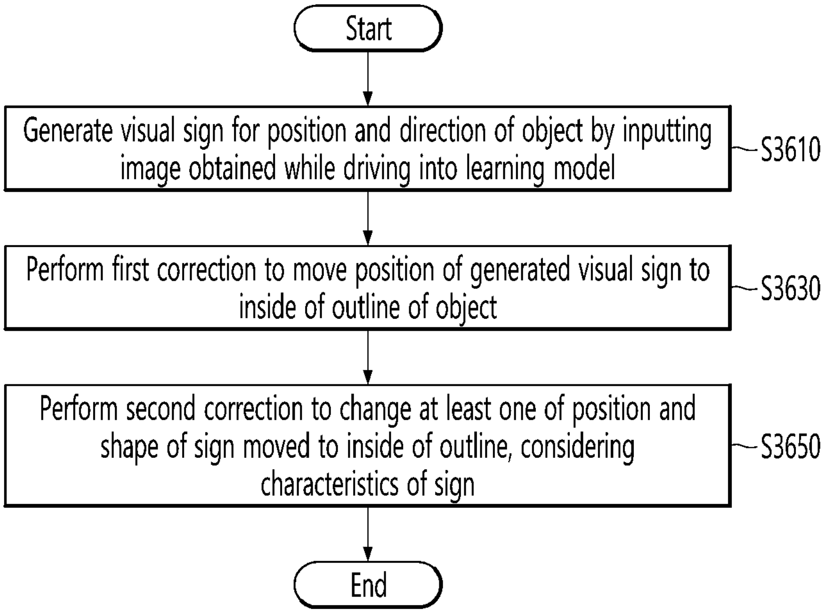
FIG. 36 is a flowchart of an example of a visual sign correction method according to the present disclosure.

FIG. 36 is a flowchart of an example of a visual sign correction method according to the present disclosure.

The method of FIG. 36 may be implemented by the visual sign correction method described above with reference to FIG. 31, and thus, the descriptions provided above with reference to FIGS. 31 to 35 will be omitted.

The visual sign correction device 3100 may input an image obtained while driving into a learning model, and generate a visual sign for the position and direction of an object detected from the image (S3610). Alternatively, an object included in the image obtained while driving may be recognized, and the recognized object may be input into the learning model to generate a visual sign for the position and direction of the object.

The visual sign correction device 3100 may perform first correction to move the position of the visual sign generated in operation S3610 to the inside of an outline of the object (S3630).

The visual sign correction device 3100 may perform second correction to change at least one of the position and shape of the visual sign moved to the inside of the outline, based on the characteristics of the visual sign (S3650).

Figure 37:
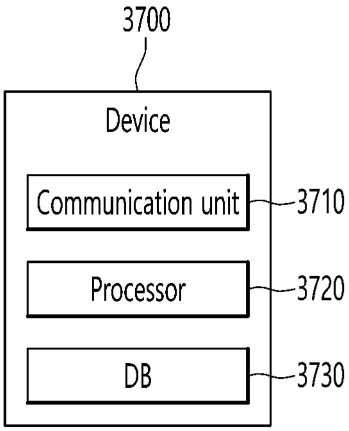
FIG. 37 is a block diagram of a visual sign correction device according to an embodiment.

FIG. 37 is a block diagram of a visual sign correction device according to an embodiment.

Referring to FIG. 37, a visual sign correction device 3700 may include a communication unit 3710, a processor 3720, and a DB 3730. FIG. 37 illustrates the visual sign correction device 3700 including only the components related to an embodiment. Therefore, it would be understood by those of skill in the art that other general-purpose components may be further included in addition to those illustrated in FIG. 37.

The communication unit 3710 may include one or more components for performing wired/wireless communication with an external server or an external device. For example, the communication unit 3710 may include at least one of a short-range communication unit (not shown), a mobile communication unit (not shown), and a broadcast receiver (not shown).

The DB 3730 is hardware for storing various pieces of data processed by the visual sign correction device 3700, and may store a program for the processor 3720 to perform processing and control.

The DB 3730 may include RAM such as DRAM or SRAM, ROM, EEPROM, a CD-ROM, a Blu-ray or other optical disk storage, an HDD, an SSD, or flash memory.

The processor 3720 controls the overall operation of the visual sign correction device 3700. For example, the processor 3720 may execute programs stored in the DB 3730 to control the overall operation of an input unit (not shown), a display (not shown), the communication unit 3710, the DB 3730, and the like. The processor 3720 may execute programs stored in the DB 3730 to control the operation of the visual sign correction device 3700.

The processor 3720 may control at least some of the operations of the visual sign correction device described above with reference to FIGS. 31 to 36.

For example, the processor 3720 may use an image obtained while driving as an input of a learning model, generate a visual sign for the position and direction of an object detected from the image, perform first correction to move the position of the generated visual sign to the inside of an outline of the object, and perform second correction to change at least one of the position and shape of the visual sign moved to the inside of the outline, based on the characteristics of the visual sign.

The processor 3720 may be implemented by using at least one of ASICs, DSPs, DSPDs, PLDs, FPGAs, controllers, microcontrollers, microprocessors, and other electrical units for performing functions.

An embodiment of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. Also, numerous modifications and adaptations will be readily apparent to one of ordinary skill in the art without departing from the spirit and scope of the present disclosure.

Accordingly, the spirit of the present disclosure should not be limited to the above-described embodiments, and all modifications and variations which may be derived from the meanings, scopes and equivalents of the claims should be construed as failing within the scope of the present disclosure.

According to an embodiment of the present disclosure, effective annotation may be performed on an object included in image data for artificial intelligence learning and vehicle driving control. In particular, a bounding box may be generated in an appropriate manner according to the type of an object.

In addition, by suggesting particular criteria for objects that may be difficult to annotate, errors in extracting particular objects may be minimized.

According to the present disclosure, it is possible to accurately collect three-dimensional information (cuboid information) about the direction of an object in an image even in a complex road environment, making it possible to generate basic information for implementing a stable autonomous driving algorithm.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of annotating a detected object, the method performed by a processor included in a device for annotating the detected object, the method comprising:
- classifying a class of the object;
- generating a bounding box comprising a first quadrangle and a second quadrangle both sharing one side, for the object based on the class of the object; and
- generating an annotation on the object in units of the bounding box;
- wherein the first quadrangle is a rectangle, and the second quadrangle is a trapezoid,
- wherein the first quadrangle corresponds to a front or a rear of the object, and the second quadrangle corresponds to a left side or a right side of the object,
- wherein, in a case where an upper surface of the detected object is exposed, the first quadrangle or the second quadrangle comprises the upper surface of the detected object,
- wherein the first quadrangle and the second quadrangle are generated to include images of the detected object.

2. The method of claim 1, further comprising determining attributes of the object,
- wherein the generating of the annotation comprises generating an annotation regarding the class of the object and the attributes of the object, in units of the bounding box.

3. The method of claim 2, wherein the attributes of the object comprises visibility, a movement state, a lane position, a major state, a size and a subclass of the object.

4. The method of claim 1, wherein the class of the object is any one of 'car', 'van', 'truck', 'two-wheeled vehicle', 'pedestrian', 'emergency vehicle', or 'etc.'.

5. The method of claim 1, wherein, in a case where the object is a car designed to transport goods and is loaded with another vehicle, a class of the other vehicle is not classified.

6. The method of claim 1, wherein the generating of the bounding box comprises generating the bounding box by applying different criteria depending on the classified class of the object.

7. The method of claim 6, wherein, in a case where the class of the object is 'two-wheeled vehicle' or 'pedestrian', a width of the first quadrangle is generated to be equal to a width of a shoulder of a person included in the object.

8. The method of claim 1, wherein, in a case where the object is a wheeled vehicle, the second quadrangle comprises a line segment connecting wheel-ground points to each other.

9. The method of claim 1, further comprising, in a case where the detected object is a vehicle and a proportion of the object visible in image data is less than a threshold proportion of a total size of the object, determining not to generate the bounding box.

10. The method of claim 1, further comprising controlling an ego vehicle based on the generated annotation.

11. A non-transitory computer-readable recording medium having recorded thereon a program for causing a computer to execute the method of claim 1.

12. A device for annotating a detected object, the device comprising:

a memory storing at least one program; and a processor configured to execute the at least one program to classify a class of the object, generate a bounding box comprising a first quadrangle and a second quadrangle both sharing one side, for the object based on the class of the object, and generate an annotation on the object in units of the bounding box, wherein the first quadrangle is a rectangle, and the second quadrangle is a trapezoid, wherein the first quadrangle corresponds to a front or a rear of the object, and the second quadrangle corresponds to a left side or a right side of the object, wherein, in a case where an upper surface of the detected object is exposed, the first quadrangle or the second quadrangle comprises the upper surface of the detected object, wherein the first quadrangle and the second quadrangle are generated to include images of the detected object.

* * * * *